(12) United States Patent
Sampath et al.

(10) Patent No.: US 10,572,270 B1
(45) Date of Patent: Feb. 25, 2020

(54) WAKEUP FROM HIBERNATION STATE USING MOTION SENSOR

(71) Applicant: Amazon Technologies, Inc., Seattle, WA (US)

(72) Inventors: Sridhar Sampath, Cupertino, CA (US); Siddharth Gupta, San Bruno, CA (US); Rakesh Varadarajan, Sunnyvale, CA (US); Soundararajan Thangaraj, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 15/449,776

(22) Filed: Mar. 3, 2017

(51) Int. Cl.
| | |
|---|---|
| *G06F 9/00* | (2006.01) |
| *G06F 15/177* | (2006.01) |
| *G06F 9/4401* | (2018.01) |
| *H04B 1/3827* | (2015.01) |
| *G06F 1/3296* | (2019.01) |

(52) U.S. Cl.
CPC .......... *G06F 9/4418* (2013.01); *G06F 9/4406* (2013.01); *H04B 1/3827* (2013.01); *G06F 1/3296* (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 9,602,508 | B1 * | 3/2017 | Mahaffey | ............ H04L 63/0869 |
| 2008/0082845 | A1 | 4/2008 | Morisawa | |
| 2012/0096561 | A1 * | 4/2012 | Sugiyama | ............. G06F 9/4401 |
| | | | | 726/26 |
| 2012/0131365 | A1 | 5/2012 | Tabone et al. | |
| 2013/0007496 | A1 | 1/2013 | Tamura | |
| 2014/0134990 | A1 | 5/2014 | Masuda | |
| 2014/0195792 | A1 * | 7/2014 | Chew | .................... G06F 1/3231 |
| | | | | 713/2 |
| 2014/0298062 | A1 | 10/2014 | Lee | |
| 2014/0317734 | A1 * | 10/2014 | Valencia | ................ G06F 21/552 |
| | | | | 726/22 |
| 2015/0254943 | A1 * | 9/2015 | Daeef | ....................... G08B 3/10 |
| | | | | 340/539.11 |

(Continued)

*Primary Examiner* — Mohammed H Rehman
(74) *Attorney, Agent, or Firm* — Eversheds Sutherland (US) LLP

(57) ABSTRACT

A processor configured to reduce the amount of time necessary for a mobile device to resume from a hibernation state is described. While in the hibernation state, power to all components of a mobile, except a motion sensor, may be powered off. The processor, upon receiving a signal from a wakeup sensor, causes the mobile device to initiate a transition from the hibernation mode to an awake mode. A validation sensor on the mobile device detects a user contact with the mobile device or user proximity with respect to the mobile device. Upon receiving a validation signal confirming validation of the transition from the hibernation state to the awake state, the processor resumes the transition to the awake mode. In the awake mode the mobile device may detect user input indicative of activating the mobile device. Upon receiving a signal indicating user input to activate the device, the processor may cause the device to become fully active, and ready for user interaction.

20 Claims, 12 Drawing Sheets

(56) References Cited

U.S. PATENT DOCUMENTS

| | | | |
|---|---|---|---|
| 2015/0339914 A1* | 11/2015 | Kekalainen | G01D 4/002 340/506 |
| 2016/0054786 A1* | 2/2016 | Chenault | G06F 1/3212 710/313 |
| 2016/0077576 A1 | 3/2016 | Karhu | |
| 2016/0335471 A1* | 11/2016 | Alameh | G06K 9/00013 |
| 2017/0093228 A1* | 3/2017 | Fisher | H02J 50/30 |

* cited by examiner

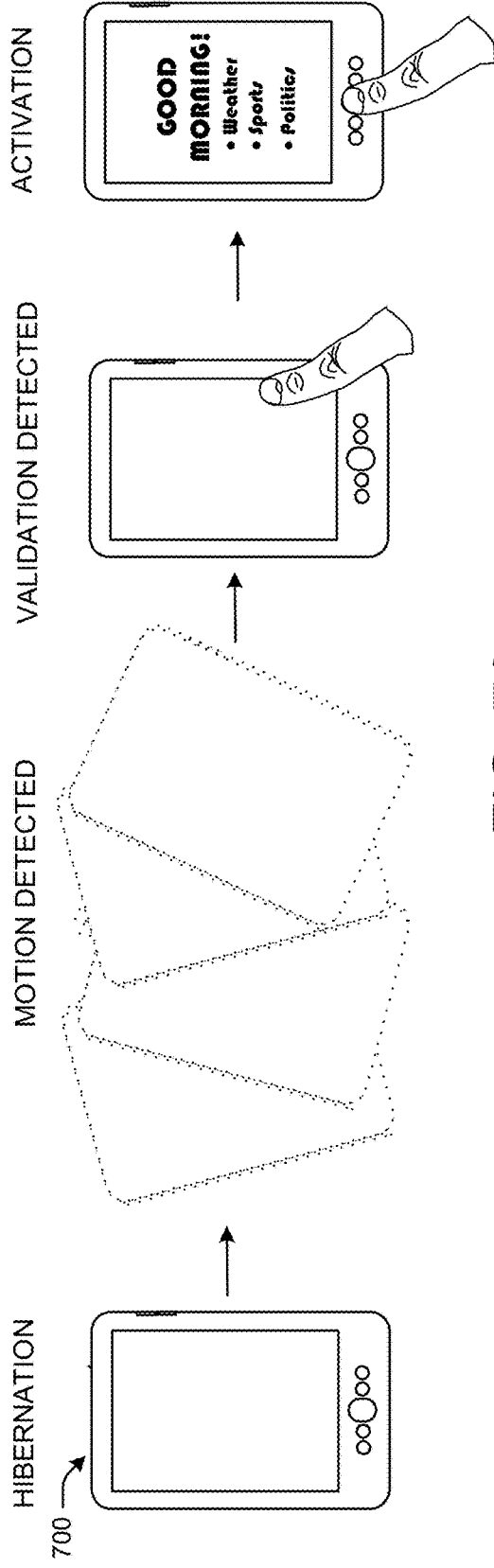
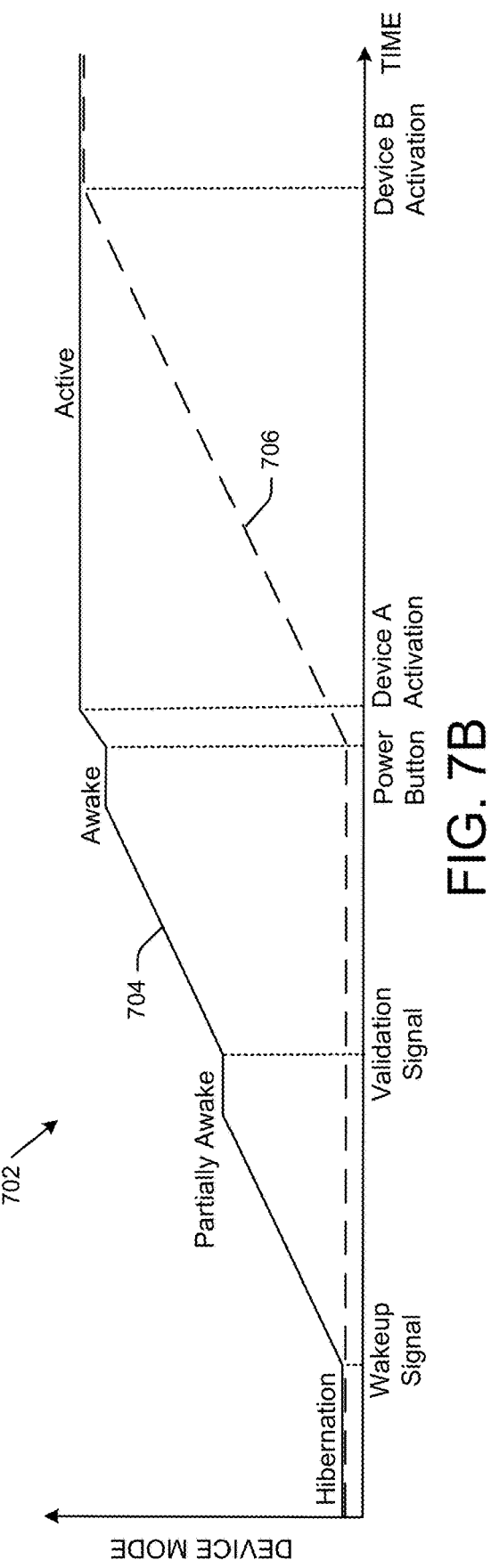
FIG. 7A
FIG. 7B

WAKEUP FROM HIBERNATION STATE USING MOTION SENSOR

BACKGROUND

Mobile electronic devices are becoming more and more popular as the number of functions performed by such devices continues to expand. Devices like the smartphones, tablets, and electronic readers (e-readers) are now intimate parts of daily life, both work and recreational. This popularity has created a desire for increasing device usage time per battery charge so that a device is operational when desired, sometimes after long idle periods.

In an effort to extend the time of use on a single battery charge mobile device battery, management systems have been developed. One feature of such management systems places the device in a suspend or hibernate mode (or state) to reduce power to a hard drive and other components after a period of idle time. While these and other techniques may lengthen the time a device may remain idle on a single battery charge, they may also impact the user experience because it takes time to wake a device up, particularly from a hibernate mode.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 7A is a schematic diagram illustrating a transition from one operational mode to another, for example, from hibernation to active, in accordance with one or more example embodiments of the disclosure.

FIG. 7B is a graph illustrating the improved activation time to resume a mobile device from a hibernation mode in accordance with one or more example embodiments of the disclosure.

DETAILED DESCRIPTION

Overview

Figure 1A:
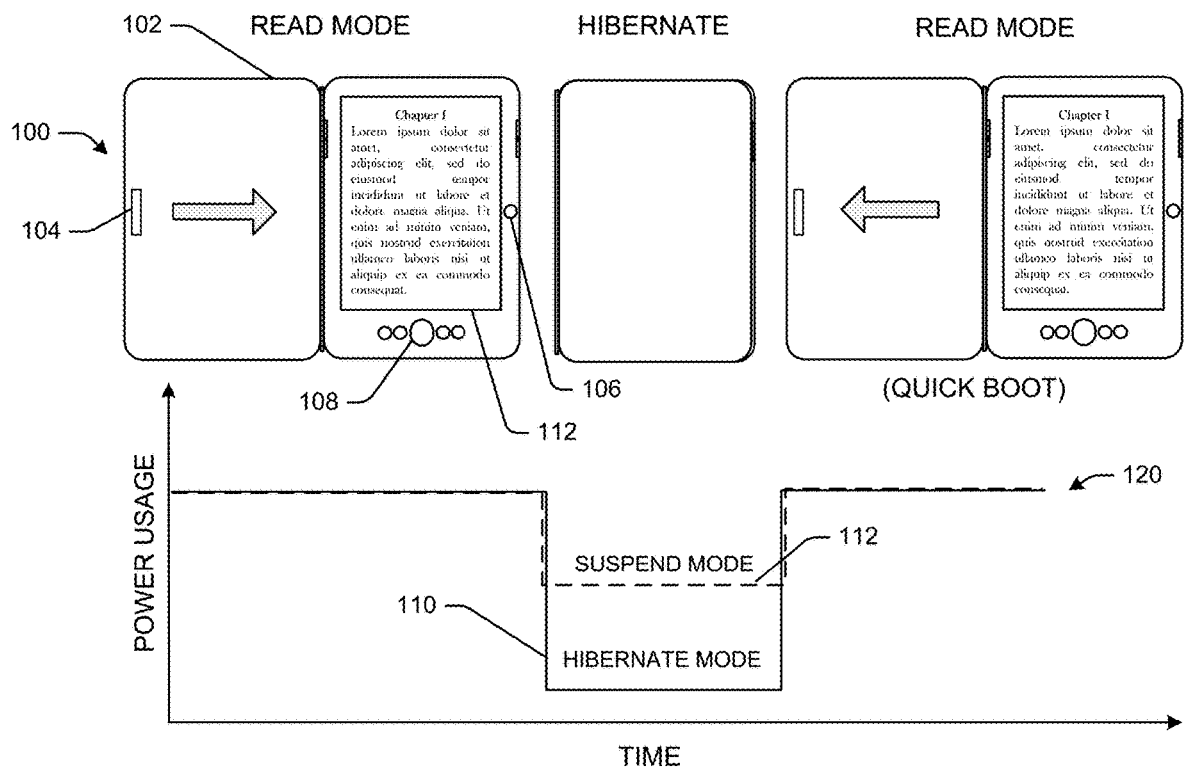
FIG. 1A is a schematic diagram illustrating power usage in different operational modes of a mobile device with a hibernate mode in accordance with one or more example embodiments of the disclosure, as compared to a mobile device without a hibernate mode.

This disclosure relates to, among other things, a hibernate mode in a mobile device that increases the device use time per battery charge by reducing the power usage during idle periods, without materially increasing the time to awaken the device from the hibernate mode (that is, from a prolonged idle state). As an example embodiment, an electronic reader (e-reader) may include a cover to protect the device, which may include a magnetic portion, and a sensor for sensing the opening and closing of the cover, which may be referred to as the cover sensor. In one example embodiment the cover sensor may include a hall sensor that may detect closing of the cover and in response send an interrupt signal to a processor on the device. The processor, upon receiving the interrupt signal, may send a suspend signal to a power management integrated circuit (PMIC) on the device, which may transition the device into a suspend mode upon receiving the suspend signal. In a suspend mode, however, both the PMIC and a processor of the device may be awake and powered on but they may consume less power than they would in an awake or read mode of the device. The processor on the device may initiate a timer upon transitioning into the suspend mode, and when the timer ends or a threshold of time has passed the processor may send a hibernate signal to the PMIC based on the premise the device is unlikely to be awakened any time soon if it was not awakened during the period of the timer. The PMIC, upon receiving the hibernate signal, may power down or shut down the processor and the PMIC to conserve battery in a hibernate mode of the device. In the hibernate mode, however, the cover sensor, such as the hall sensor, and a low power boot control circuit or device may still be powered on to detect the opening of the cover and to awaken or boot the device.

In one example embodiment, the e-reader may include a quick boot feature, wherein when the processor determines that the timer has ended in a suspend mode, the processor may store all processes running on the processor and registry content from the memory data register in a non-volatile memory on the device. This way, when opening of the cover generates an awake signal, which is sent to a low power boot control circuit or device, the boot control circuit may send an awake signal to an ON/OFF control switch on the device, which in turn sends the awake signal to the PMIC, which may initiate a quick boot in accordance with example embodiments of the disclosure. For example, in response to the awake signal, the PMIC wakes up and powers on the processor. The processor may then restore all the processes and registry content of the memory data register stored in the non-volatile memory, which was stored at the time the device transitioned into the hibernate mode, and transition the device to the operational state it was in prior to transitioning to the suspend mode with little or no perceived delay to the end user.

One or more example embodiments relate to a mobile device including the hibernate mode described above. The mobile device, according to one or more example embodiments, may include a low power input sensor, such as the cover sensor or a motion detector, and a low power boot control circuit or device, both of which may be powered in a hibernate mode of the device. The PMIC and the processor, however, may be powered down or shut down in this example hibernate mode. The device may also include the quick boot feature, wherein the processor may store all processes running on the processor and registry content from the memory data register in a non-volatile memory on the device before transitioning to the hibernate mode. This way, when the device receives an awake signal from the user, the cover sensor senses opening of the cover or the motion sensor detects movement of the device such as the user picking up the device for use, and the boot control circuit may send an awake signal to the PMIC, which in turn may power on the processor. The processor at this stage may be able to retrieve all the processes and registry content stored in the non-volatile memory, and instantaneously transition the device to the state it was in prior to transitioning to the suspend mode.

One or more example embodiments relate to a mobile device including a wakeup sensor and a validation sensor for waking up a device from hibernation in anticipation of the user turning on (or activating) the device. For example, the wakeup sensor may include a motion detector that detects when the user is picking up the device. Other possible wakeup sensors may include, but are not limited to, a Hall sensor associated with a device cover (as discussed herein), a proximity sensor or capacitive touch sensor, an audible sensor, or optical sensor, or any combination thereof. This may start the wakeup process to transition the device from a hibernate mode to an awake mode, wherein the device is ready for the user to turn on, referred to herein as the active mode. However, to avoid false wakeups, a validation sensor may be utilized to confirm with some certainty that the user is about to use the device before the device is fully awakened, which may be an unwanted consumption of power if the user is not about to use the device. For example, if the wakeup sensor includes a motion sensor, then carrying the device in a bag may trigger the awake process unnecessarily, because that motion is not indicating the user is about to use the device. Using a validation sensor, the device is able to avoid transitioning the device from a hibernation mode to an awake mode unnecessarily. In some embodiments, the wakeup sensor may be disabled for a period of time when, for example, the motion sensor detects motion several times in a row, or within a predetermined period of time, without confirmation from a validation sensor that the user is about to activate the device. Examples of validation sensors include, but are not limited to, a capacitive touch sensor that detects the user holding the device, a cover sensor that detects the opening of the cover, an optical sensor that detects, for example, a gaze of the user towards the display of the device, a proximity sensor to detect human presence within a range of the device, touch or proximity sensor and or sensor array on the back housing or cover of a device, capacitive touch sensor(s) on one or more mechanical buttons (e.g., page turn buttons, mute buttons, volume buttons, etc.), audible sensor, or any combination thereof. Once the validation indicator is detected, then the device may transition fully from the hibernate mode to an awake mode awaiting the user to activate the device, such as by pressing the power button. At the press of the power button, the device is already awake (or close to being in the awake mode) so the user experiences little to no delay in the activation of the device for use, which provides a better user experience.

In some embodiments, if a user does not activate the device following the detection of a movement or motion of the device by the wakeup sensor and the detection of a touch or proximity of the user by the validation sensor, the wakeup sensor may be disabled for a period of time to avoid false wakeups. For instance, where the wakeup sensor includes a motion sensor and the validation sensor includes a capacitive touch sensor, if the user is holding the device in hand and walking, then both the wakeup sensor and the validation sensor may detect movement of the device and the user's touch, respectively, but the user is not activating the device. Disabling the wakeup sensor for a period of time in such circumstances may avoid unwanted wakeups, and thereby conserve power.

Illustrative Devices and Associated Operations

A. Hall Sensor Smart Cover

FIG. 1A is a schematic diagram illustrating different operation modes in a mobile device 100 in accordance with one or more example embodiments of the disclosure. Device 100 may be any electronic device such as an electronic reader (e-reader), a smartphone, a tablet, a phablet, or any variation thereof. Device 100 may include a display screen 112, which may be used by a user to read or consume contents being displayed thereon. Device 100 may include one or more control devices 108 which may be used to control the operation of the device 100 or navigate the content being displayed on the display screen 112 or to control the settings of the display screen 112 according to a user's preference. Device 100 may have a cover 102, which may include one or more magnets 104. Device 100 may also include one or more hall sensors 106 which may be used to detect the magnet 104, thereby sensing the closing and opening of the cover 102 for purposes of placing the device in a hibernate mode or awaking the device from the hibernate mode. For illustrative purposes, the device 100 is depicted as an e-reader.

The top portion of FIG. 1A illustrates different modes or states of the device 100, including a hibernate mode according to one or more example embodiments of the present disclosure. FIG. 1A also illustrates the corresponding modes or states in a device 160, which is similar to mobile device 100 but without a hibernate mode. The graph 120 compares power usage between devices 100 and 160 in the various modes. Beginning with an awake or read mode, the covers of both devices 100, 160 are open and the devices are in use. During this mode both devices may use or consume approximately the same amount of battery power, as illustrated in graph 120. However, when the cover of each device 100, 160 is closed, the mobile device 160 may transition to a suspend mode 112 while device 100 may transition to a hibernate mode 110 after a brief period of time in a suspend mode. As illustrated in the graph 120, device 100 in the hibernate mode 110 may consume relatively less power when compared to device 160 in a suspend mode 112. When the cover is opened, devices 100, 160 both may transition back to the awake or read mode. As discussed in detail below, the device 100 may include a quick boot feature that may allow the device to transition from the hibernate mode to an awake mode in a timely fashion that is not disruptive of the user's experience.

Figure 1A:
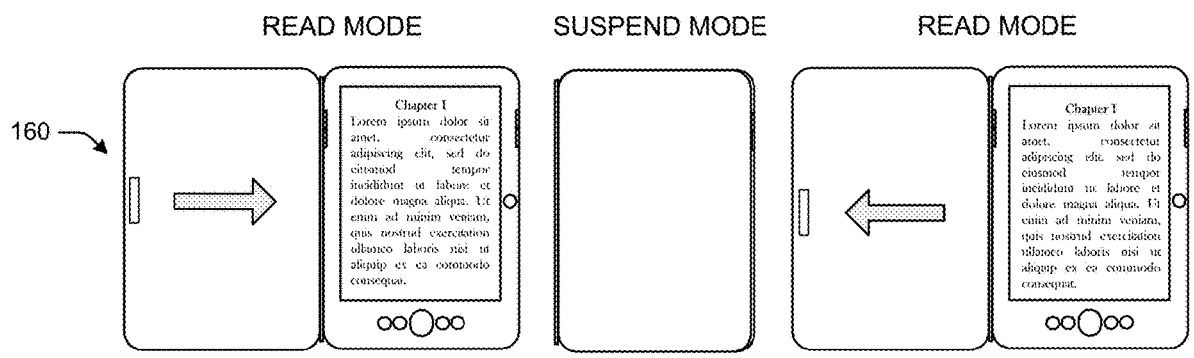
Figure 1B:
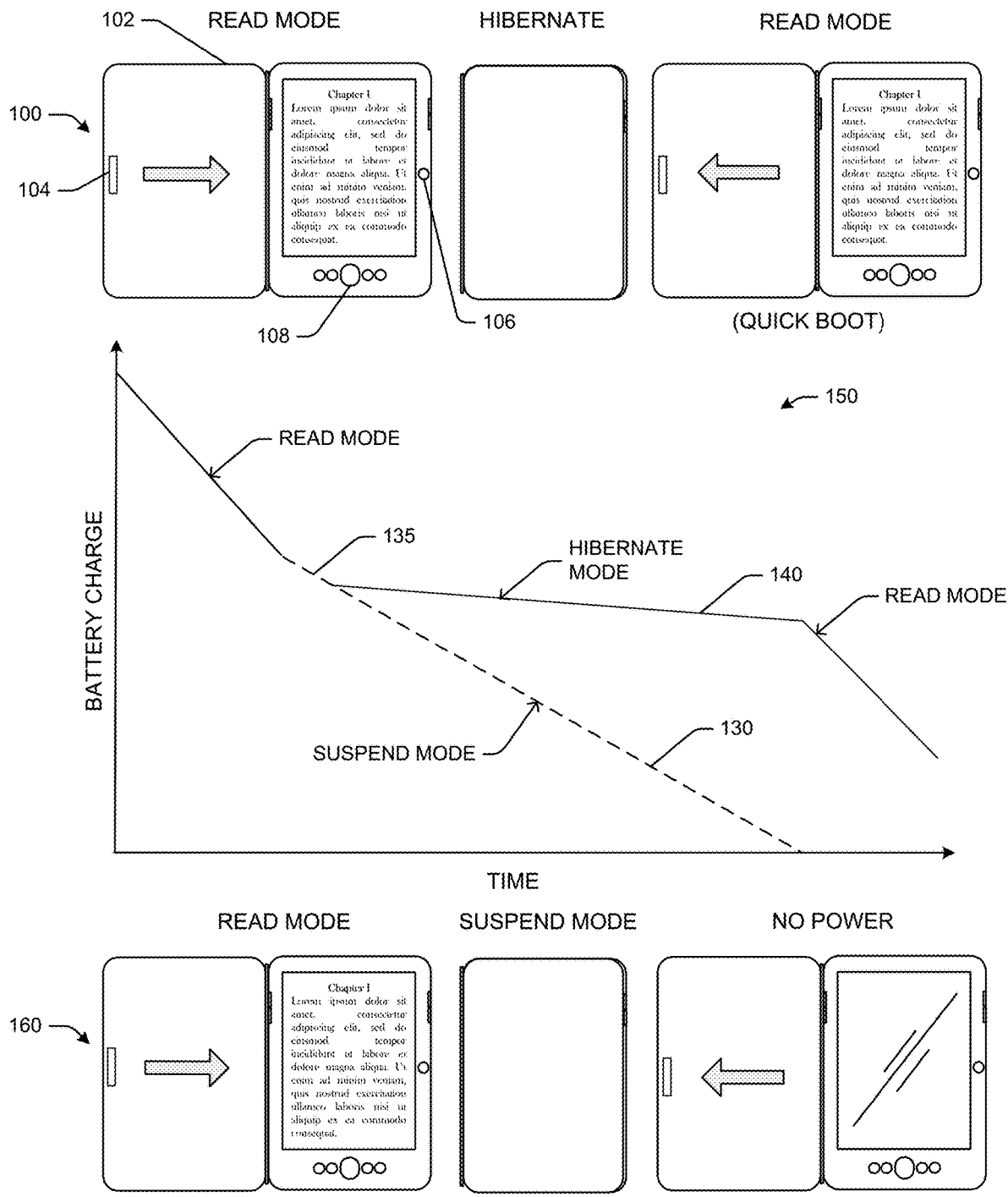
FIG. 1B is a schematic diagram illustrating battery charge in different operational modes of a mobile device with a hibernate mode in accordance with one or more example embodiments of the disclosure, as compared to a mobile device without a hibernate mode.

Turning now to FIG. 1B, graph 150 compares battery charge depletion rates between mobile devices 100 and 160 over a period of time, wherein the device 100 includes a hibernate mode and the device 160 does not. Beginning with an awake or read mode, the covers 102 of both devices 100, 160 are open and the devices are in use or read mode. During this mode both devices may have the same or substantially similar battery discharge rates, as illustrated in graph 150. However, when the covers 102 are closed, the mobile device 160 transitions into a suspend mode and the device 100 initially transitions into a suspend mode for a brief period 135 and then into a hibernate mode. Because device 100 uses relatively less power in the hibernate mode than the device 160 uses in the suspend mode, as illustrated in FIG. 1A, the discharge rate 130 of the device 160 is greater than the discharge rate 140 of the device 100. As illustrated, the device 100 with the hibernate mode may be able to return to an awake or read mode long after the device 160 runs out of power. This is desirable, such as in the case of the device 100 being an e-reader, where a user may not use the device for extended periods of times, even weeks, and rather than finding the device out of power when the user opens the cover the user still has power and can continue using the device from where he or she had left off.

In accordance with an aspect of the disclosure, in the hibernate mode various components of the device 100 may be powered down while maintaining power to the other components. For example, the device 100 may include a power management integrated circuit (PMIC) providing power to a processor, which may both be powered down in a hibernate mode, while a low power boot control circuit or device and a hall sensor in communication with the processor to signal when, for example, the cover is opened or closed, may be powered on in the hibernate mode. In accordance with an embodiment of the disclosure, the device 100 may have a reading or awake mode, a suspend mode, a hibernate mode and a halt mode. In a reading or awake mode, all components of the device may be powered on, and the power consumption may be higher when compared to other modes on the device. In a suspend mode, the PMIC and processor are kept operational (i.e., powered on) and the power consumption during suspend mode may be relatively higher when compared to the hibernate mode or halt mode. In a hibernate mode, however, the PMIC and processor of the device may be powered down and the only components receiving power may be the hall sensor in the device and a low power boot control circuit or device, which may be operatively coupled to each other. The low power boot control circuit or device is preferably a low power component that determines when to transition the device 100 from a hibernate mode to a read or awake mode using inputs from the hall sensor and the processor. In a halt (shutdown) mode, power may be removed from all components of the device 100, including that to the hall sensor and the boot control circuit. To wake up the device 100 from the halt mode, the user may press an ON/OFF button of the device 100, which may trigger a boot signal to the PMIC.

In the mobile device 160, in an illustrative embodiment of an e-reader, without a hibernate mode, the suspend mode may consume about six to seven hundred micro-amps of battery power per hour. In an e-reader configuration, this may result in a suspend mode that may last about one month under a typical use case scenario including, for example, half hour reading and 23.5 hours of suspend mode per day. Users typically do not halt (shutdown) the device to save power because it takes a relatively long time, sometimes more than 30 seconds, to boot from halt to be ready to use the device compared to only a few seconds transitioning from suspend mode to reading mode. In comparison, in a hibernate mode in device 100 the current can be reduced to about fifty micro-amps, for example, more than ten times less than that in the suspend mode. Consequently, the run/idle time can be more than doubled under the same conditions using a hibernate mode in accordance to an embodiment of the disclosure, and user experience can be greatly improved. As an example end result, the user may experience twice as long usage or more per single battery charge.

In addition, a user may expect such a mobile device to wakeup upon opening the cover and expect the device to suspend upon closing the cover. In an example implementation the cover may include a magnet and the device may include a hall sensor to detect the opening and closing of the cover by sensing the magnetic field strength and may send a logic signal or an interrupt signal to the mobile device's processor or the boot control circuit depending on a current state of the device. For example, if the mobile device 100 is in an awake mode, then the signal from the hall sensor may trigger an interrupt signal to the processor to transition the device to a suspend mode, and if the device is in a suspend or hibernate mode, then the signal from the hall sensor may trigger an awake signal to the boot control circuit of the device. While a hall sensor is presented as an illustrative method for triggering a power mode transition, it will be appreciated that other devices and/or techniques may be utilized, such as an accelerometer, an optical sensor, an ambient light sensor, a camera device, a capacitive sensor, an audio sensor, or any sensor with a digital output.

Figure 2:
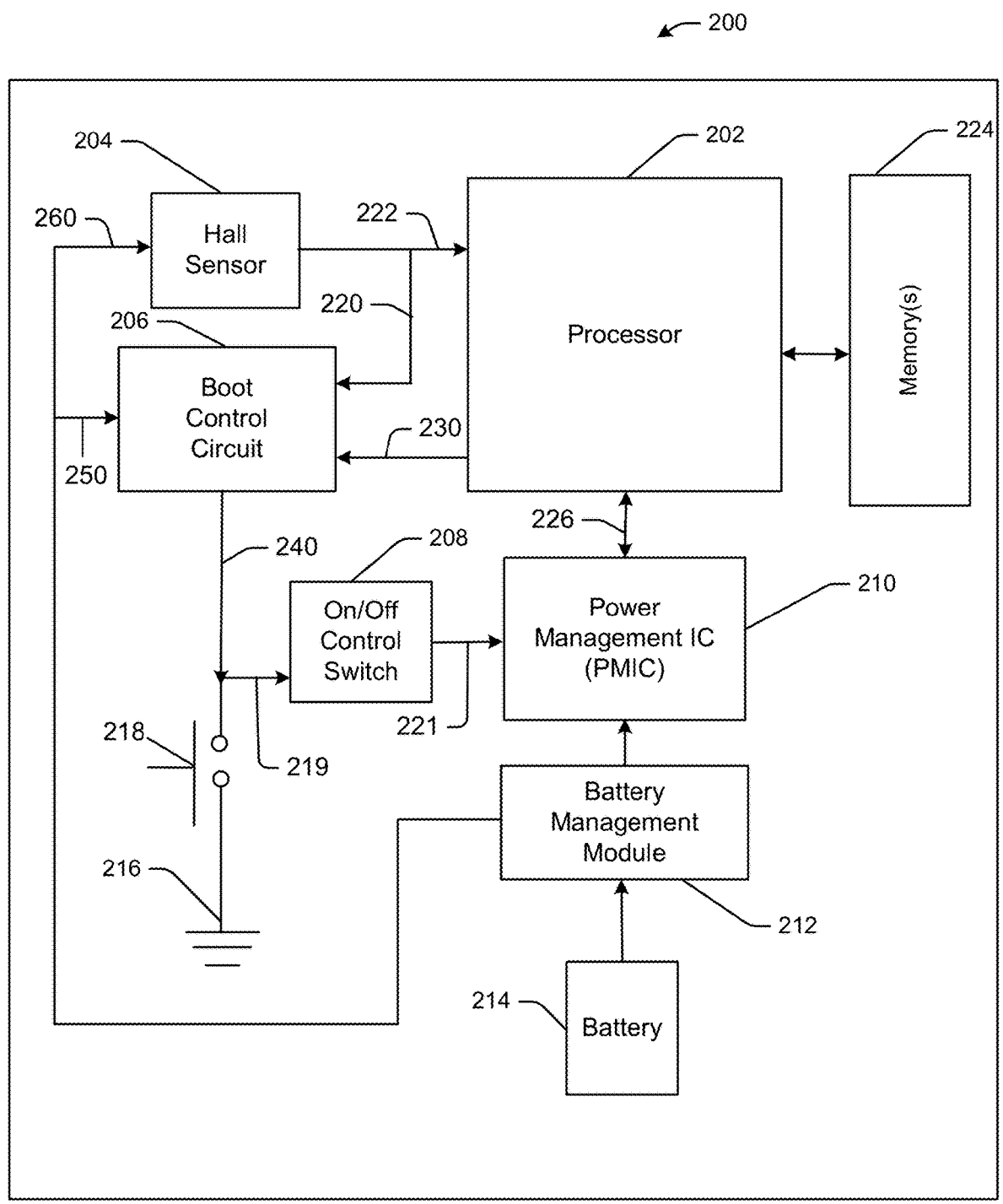
FIG. 2 is a schematic diagram of an illustrative mobile device in accordance with one or more example embodiments of the disclosure.

FIG. 2 illustrates an example system diagram of a mobile device 200 (illustrated as device 100 in FIG. 1), according to one or more example embodiments. The mobile device 200 may include one or more processors 202 that may be powered by a power management integrated circuit (PMIC) 210, which may receive power from a battery management module 212. The battery management module 212 may be connected to a battery 214, which may act as source of power to the device 200. The battery 214 may include any battery suitable for the purpose, including but not limited to Lithium ion batteries, Lithium polymer batteries, and NiCad batteries. The battery management module 212 may provide power to the PMIC as well as the other components on the device. Although battery management module 212 and the PMIC 210 are illustrated as being two separate components in FIG. 2, they may both be part of the same chip. The PMIC 210 may be an integrated circuit for managing power requirements of various components of device 200 and managing power distribution in the device 200. The PMIC 210 may be a solid state device that may control the flow and direction of electrical power within the device 200. The PMIC 210 may provide high efficiency power conversion that may minimize energy loss or heat loss. The PMIC 210 may have one or more functions including but not limited to DC to DC conversion, battery charging, power-source selection, voltage scaling, power sequencing, or other miscellaneous functions. The PMIC 210 may also include battery management, voltage regulation, and charging functions. It may include a DC to DC converter to allow dynamic voltage scaling. PMIC 210 may use pulse-frequency modulation (PFM) or pulse-width modulation (PWM).

The device 200 may include one or more power switches 218 grounded at 216, which may be operatively coupled to an ON/OFF button on the device to receive inputs from a user. The user inputs via the power button 218 may cause the mobile device to transition from one mode to the other, such as transitioning from an awake mode to a suspend mode or from a suspend or hibernate mode to an awake mode by, for example, pressing or otherwise actuating the power button 218. The power button 218 may be operatively coupled with a ON/OFF control switch 208 on the mobile device, which may take the signal on line 219 as input and generate an output on line 221, which may be communicated as a logical signal input to the PMIC 210. Logical inputs may include digital inputs, such as a "1" for an awake signal and a "0" for a suspend signal. For example, when the mobile device 200 is in a reading mode and the user presses the power button 218 on the mobile device, a suspend signal "0" may be sent to the ON/OFF control switch 208, which in turn may pass that suspend signal to the power management IC 210. The processor 202, executing system software, may be able to determine a current state of the device and upon receiving the suspend signal from the PMIC the processor may be able to transition the device into a suspend mode.

The mobile device 200 may also include an input sensor, such as a hall sensor 204, which may be able to detect a magnetic field from a magnet coupled to, for example, the cover of the mobile device. Additionally, or alternatively, the input sensor may be an accelerometer, an optical sensor, an ambient light sensor, a camera device, a capacitive sensor, an audio sensor, or any sensor with a digital output. The one or more processors 202 (also referred to as processor 202) may be in communication with one or more memories 224, which may include one or more volatile memories and one or more non-volatile memories. Memory 224 may store one or more processes which may be executed by the processor 202.

According to one or more example embodiments, battery management module 212 may provide power to the hall sensor 204 and a low power boot control circuit or device 206 via low voltage power rails 260 and 250, respectively. Boot control circuit 206 may be an analog or digital circuit that may be able to receive and process an output from the hall sensor 204. The boot control circuit may be operatively coupled to the hall sensor 204 and the ON/OFF control switch 208 such that the boot control circuit may relay the signal received from the hall sensor 204 at line 220 to the ON/OFF switch controller via line 219. Boot control circuit 206 may also be operatively coupled to the processor 202 such that it may receive one or more general purpose input/output signals from the processor 202 via line 230 while the processor is powered on. The general purpose input/output signals from the processor 202 disables the boot control circuit 206 and prevents the output of an awake signal by the boot control circuit 206 to the ON/OFF switch controller 208 to boot the device 200 when the device is already in an awake or suspend mode, essentially overriding the signal from the hall sensor.

In an awake or active mode of the device 200, the processor 202, PMIC 210, boot control circuit 206, and cover sensor or hall sensor 204 may be powered by the battery management module 212. Upon closing the cover, however, the hall sensor 204 may generate a logical output or interrupt signal to the processor 202 via line 220. The processor 202 may receive this logical input or interrupt signal from the hall sensor and send a suspend signal to the PMIC via line 226 to transition the device into a suspend mode. In a suspend mode, however, one or both of the processor 202 and PMIC 210 may still be powered on but may be operating in a manner that consumes lesser power than they would in an awake or read mode of the device. Upon transitioning to a suspend mode, the processor 202 may initiate a timer, and upon the timer expiring or reaching a threshold, the processor 202 may send a hibernate signal to the PMIC via line 226. The PMIC, upon receiving the hibernate signal, may power down the processor 202 and power down itself to transition the mobile device into hibernate mode to the conserve battery power of the device. In the hibernate mode, however, the hall sensor 204 and the boot control circuit 206 may still be powered on, for example, by the battery management module 212, to receive an awake signal from the user. In the embodiment of FIG. 2, the hall sensor 204 and boot control circuit 206 are low power devices and they consume as little as fifty micro amps per hour in the hibernate mode.

The timer associated with the suspend mode may be set according to user preferences or may be based on prior device usage patterns. For example, a user may select to keep the timer at 0 seconds in the device settings, in which case, the device may transition directly into a hibernate mode without transitioning into a suspend mode. Additionally or alternatively, the timer may be set by the user in the device settings to a predetermined period of time, such as 15 secs or 30 secs, and when that period elapsed following the closing of the device cover the device may transition from the suspend mode to the hibernate mode. It should be noted, however, that if the device 200 cover is opened following the activation of the timer but before the period has elapsed the device may transition to back to the awake mode from the suspend mode. In another example embodiment, the processor may track daily usage information of the device to determine a usage pattern and/or may receive usage or timer setting information or usage pattern information based on other similar devices of the same or different users, and determine a timer setting using the determined usage pattern and/or the received information. For example, a user may close the cover or suspend the device at 10 pm every evening before going to sleep. The processor 202 may track this usage pattern and set the timer so the device transition to hibernate mode within a short period of time, for instance, a few seconds, if not immediately, after the cover is closed at or around 10 pm knowing the user is unlikely to open the device cover again until the next morning. This may enable significant battery saving, and enhance user experience by maintaining the device in a charged mode for longer periods of time. In one example embodiment, the user may preset the time for transitioning the device into the hibernate mode. For example, the user may preset the device to transition to a hibernate mode from 10 pm to 5am every day knowing the user will not open the device cover until at least 5am every morning. The processor 202 may receive a user input to transition the mobile device to a hibernate mode at a predetermined time on a real-time clock of the mobile device. In this case, the processor 202 may send the hibernate signal to the PMIC 210 via line 226 to transition the device 200 to the hibernate mode at the predetermined time.

In accordance with an embodiment of the disclosure, the mobile device 200 may include hardware, software, or a combination thereof that provides for a quick boot of the mobile device 200 from the hibernate mode. The quick boot takes the device form the hibernate mode to the awake or read mode in a manner that is relatively quick compared to the booting the device from an complete off mode, thereby providing a better user experience when the user opens begins using the device, for example, when the user opens the cover of the device after an extended period of non-use (e.g., a period sufficient to allow the device to transition into the hibernate mode). In an example embodiment, a quick boot may include the storage in non-volatile memory of the device at least certain processes executing on the processor and registry content at the time the device enters a period of non-use (e.g., a hibernate mode). These processes and register content may then be quickly retrieved by the processor for reinstating operation of said processes for device use in an awake or read mode, such as upon the opening of the device's cover.

In an example embodiment, when the processor 202 determines that the timer has expired in a suspend mode, the processor 202 may store all processes running on the processor 202 and registry content from the memory data register (MDR) in a non-volatile memory 224 on the device. This way, when the device receives an awake signal from the user or the cover sensor senses opening of the cover, the boot control circuit 206 may send an awake signal to the PMIC 210 via the ON/OFF switch controller 208, which in turn may power on the processor 202. The processor 202 at this stage may be able to retrieve all the processes and registry content stored in the non-volatile memory 224, and transition the device 200 to the state it was in prior to transitioning to the suspend mode with little or no delay to the user. The MDR may act as a buffer and hold data that may be copied from the memory (e.g. RAM) so the processor 202 may be able to use it. Data may be loaded into MDR either from a memory bus or from an internal processor bus, and similarly data read from the MDR may be read from either bus.

A logic signal line 230 from the processor 202 to the boot control circuit 206 may be provide an "on" signal from the processor 202 when the mobile device 200 is in an awake or suspend mode or anytime the processor 202 is powered on. This signal disables the boot control circuit 206, and stops it from accidentally sending an awake signal to the PMIC 210. For example, when the boot control circuit 206 is receiving an "on" signal from the processor 202 via line 230 it will not generate a boot signal on line 219 even though the hall sensor is detecting the cover is opened. The boot control circuit 206 may be configured to generate a signal on line 219 only when the processor is powered down and there is no signal on line 230, and the hall sensor output on line 220 indicates the cover is opened, thereby initiating the transition from a hibernate mode to an awake mode by the boot or awake signal generated on line 219 by the boot control circuit 206.

In the hibernate mode, the battery management module 212 continues to provide power to the cover sensor or hall sensor 204 and the boot control circuit 206. When the cover is opened, the hall sensor 204 sends a logical input or interrupt signal to the boot control circuit 206, which initiates a quick boot of the device 200. The boot control circuit 206 receives the input from the hall sensor 204 and sends an awake signal to the ON/OFF switch controller 208. The awake signal is then passed on the PMIC 210 to turn on the power on the device. The PMIC 210, upon receiving this awake signal, turns on power to the processor 202 and all other components that require to be powered on in an awake mode of the device, such as a display of the device. The processor 202 at this point may restore all saved processes and registry content of the MDR from the non-volatile memory 224 and bring the device quickly to an awake or read mode. A difference between the quick boot of the disclosure and a normal boot being the processor in the case of a quick boot is able to retrieve all saved processes and registry content from the non-volatile memory on the device. However, in a normal boot, which may take up to or more than 30 seconds, the processor has to initiate all processes from start, including the kernel applications.

Figure 3:
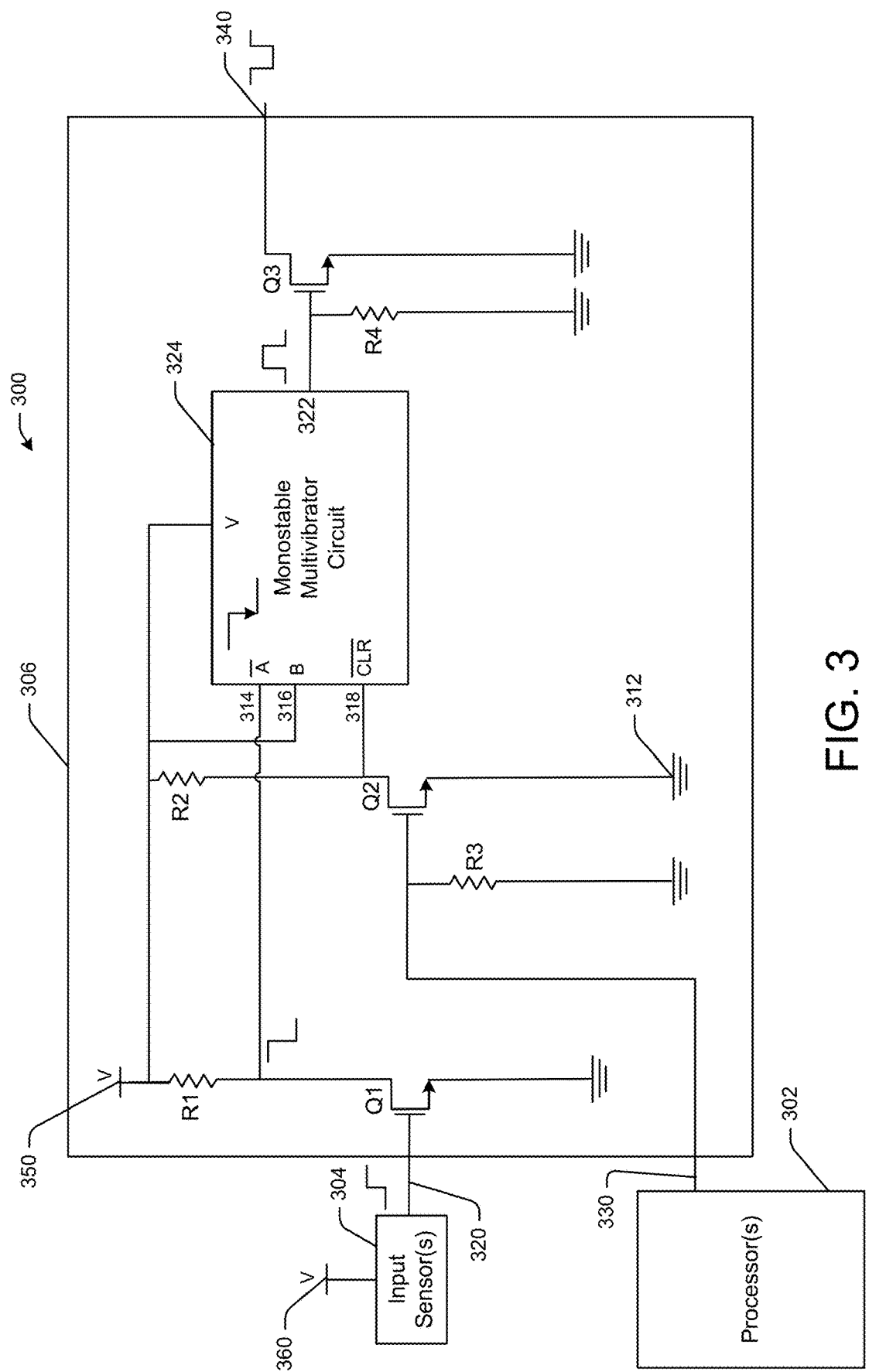
FIG. 3 is a schematic diagram of an illustrative low power boot control circuit in a mobile device in accordance with one or more example embodiments of the disclosure.

While the boot control circuit 206 may be implemented through circuit components, software, firmware or any combination thereof, FIG. 3 provides an illustrative embodiment of a boot control circuit or device 306 in a mobile device 300. As illustrated, the boot control circuit 306 may receive inputs from one or more input sensors 304, such as a hall sensor, via line 320, and one or more general purpose input/output signals (GPIO) from one or more processors 302 via line 330. The boot control circuit 306 and the input sensor 304 may receive power from the battery management module (not shown) via a digital low voltage power rail including a low voltage power supply at terminals 350 and 360, respectively.

The boot control circuit or device 306 may include a monostable multivibrator circuit 324, which may be, for example, any single triggerable monostable multivibrator circuit. Boot control circuit 306 may also include one or more resistors R1, R2, R3, and R4 that may be connected in series or parallel to one or more N-Channel metal-oxide semiconductor field effect transistors (MOSFETs) Q1, Q2, and Q3, as illustrated in FIG. 3. The MOSFET Q1 may be used to amplify or switch signals received from input sensor 304, and resistor R1 may implement electrical resistance as a circuit element in combination with the input signal of MOSFET Q1 to control the operation of the MOSFET Q1. In similar fashion, MOSFET Q2 may be used to amplify or switch signals received from processor 302, and resistor R3 may implement electrical resistance as a circuit element in combination with the input signal of MOSFET Q2 to control the operation of the MOSFET Q2. Similarly, MOSFET Q3 may be used to amplify or switch signals received from the monostable multivibrator circuit 324, and resistor R4 may implement electrical resistance as a circuit element in combination with the input signal of MOSFET Q3 to control the operation of the MOSFET Q3.

In the illustrative embodiment of FIG. 3, the resistors R1 and R2 provide operating bias for Q1 and Q2, and R3 and R4 prevent static charge build-up at the Q2 and Q3 gates. One or more of the resistors R1, R2, R3, and R4 may have a resistance of 1 MΩ or higher depending on the configuration of the boot control circuit. One or more of the MOSFETs Q1, Q2, and Q3 may have a gate to source threshold voltage of 1.2V or more depending on the configuration of the boot control circuit. According to one example embodiment, the monostable multivibrator circuit 324 may be a single triggerable monostable multivibrator chip with one or more Schmitt trigger inputs.

For example, terminal 320 may transmit an interrupt signal from the hall sensor 304 to the input gate of Q1. Hall sensor 304 may have a push output or a pull output, which can be high or low depending on whether the magnet from the cover is detected or not, e.g., the cover is closed or not. The hall sensor 304 may trigger a level change when the cover is opened, at which point the hall sensor 304 output may go from low to high, which may turn on transistor Q1 and invert the signal from high to low, essentially driving the voltage on the drain of Q1 to ground. This high to low transition may be sent to the monostable multivibrator circuit 324 at input 314. Input 314, which may be a gated active LOW-going edge input (A), may respond to a falling edge, and once it detects a falling edge, it may generate a monostable pulse at terminal 322 of the multivibrator circuit 324. The monostable pulse may momentarily turn on transistor Q3 which may invert the pulse and whose output may be sent to terminal 340. Turning on the transistor Q3 may result in pulling down of the ON/OFF control switch at terminal 340, the end result of which may be similar to an ON/OFF button press or actuation on the device.

Terminal 330 may receive a general purpose input/output (GPIO) signal from the processor 302 during periods when the processor is powered on and operating in a read or awake or suspend mode, and in response mask or disable the multivibrator circuit 324 in such a way that the opening or closing of the cover may not trigger an action, that is, produce an inverted pulse on terminal 340. For example, when terminal 330 is high, indicating the presence of a GPIO signal, such signal may turn on the transistor Q2, and pull down the CLR terminal 318 of the monostable multivibrator circuit 324, essentially driving the terminal 318 to ground 312. The CLR terminal 318 can be a gated active LOW-going edge input similar to 314. For example, when terminal 318 is held low, there may be no monostable output at 322. Accordingly, when the processor of the mobile device is powered on and running, the GPIO input at terminal 330 avoids an inverted pulse on terminal 340, thereby avoiding the triggering of the ON/OFF control switch controller.

Inputs can be driven from either a 3.3 V or a 5 V device, which may allow the use of these devices as translators in a mixed 3.3 V and 5 V environment. Schmitt trigger inputs can also make the monostable multivibrator circuit 324 circuit highly tolerant to slower input rise and fall times. The monostable multivibrator circuit 324 may be specified for partial power-down applications by disabling the output, preventing the damaging backflow current through the device when it is powered down. For example, this feature may also be useful when the device is still powered on and a quick boot signal may not be required.

Figure 4:
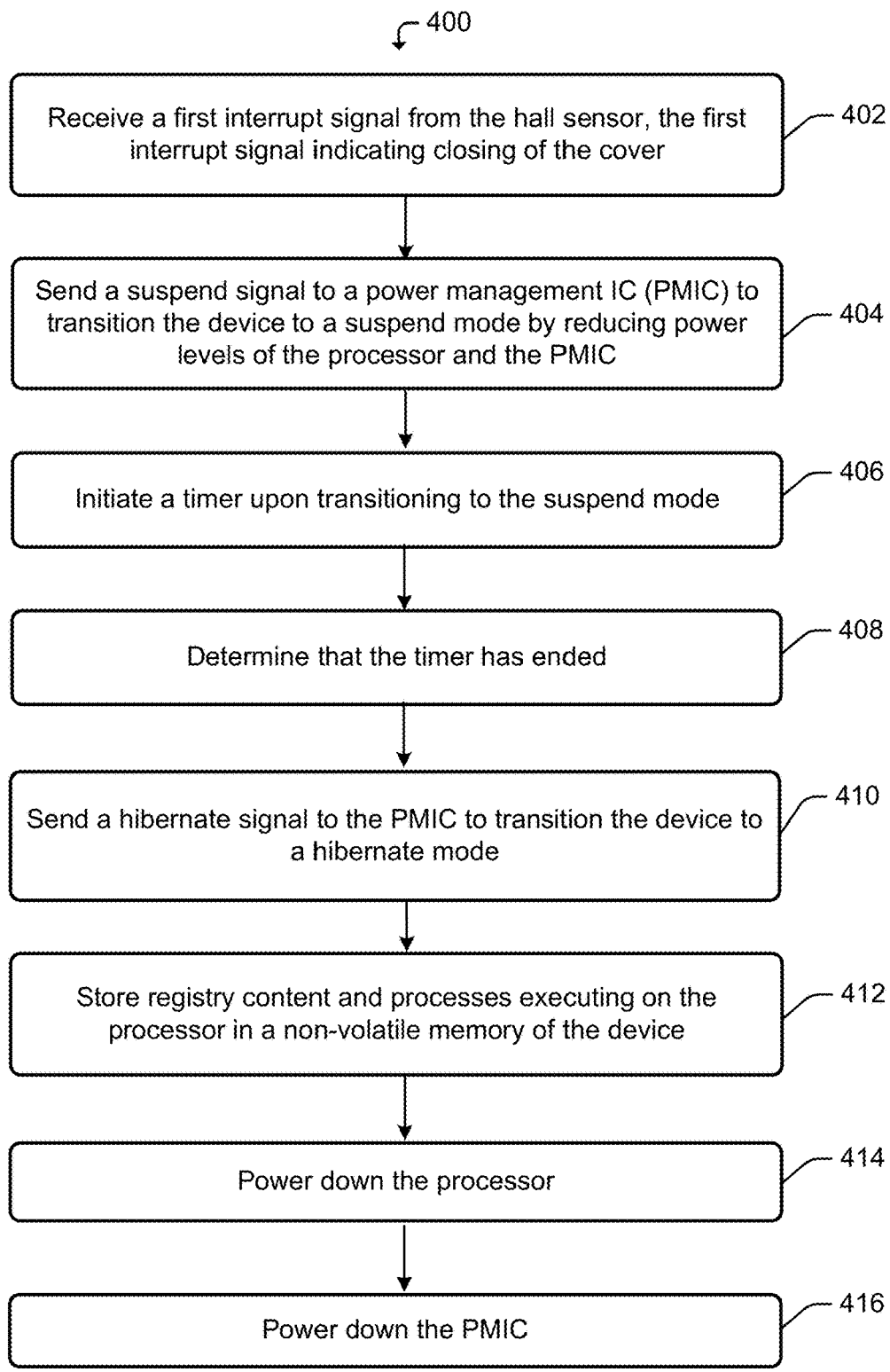
FIG. 4 is a process flow diagram of an illustrative method for transitioning a mobile device into a hibernate mode in accordance with one or more example embodiments of the disclosure.

FIG. 4 is a process flow diagram of an illustrative method for transitioning into a hibernate mode in a mobile device in accordance with one or more example embodiments of the disclosure. Referring to FIG. 4, at block 402, in an awake mode of a mobile device in accordance with an embodiment of the disclosed herein, the device's processor, PMIC, boot control circuit or device, and cover sensor or hall sensor may be powered by the device's battery management module and battery. Upon detection of the closing of the cover of the cover, the hall sensor may generate an interrupt signal, and the processor may receive the interrupt signal from the hall sensor. At block 404, the processor may send a suspend signal to the PMIC to transition the device to a suspend mode by reducing power levels of the processor and the PMIC. At block 406, the processor may initiate a timer upon transitioning to the suspend mode. In a suspend mode, however, the processor and PMIC may still be powered on. At block 408, the processor may determine the timer has ended, and at block 410 the processor may send a hibernate signal to the PMIC to transition the device to a hibernate mode. At block 412, the processor may save or store all processes running or executing on the processor and the registry content of the memory data register in a non-volatile memory on the mobile device. At block 414, the PMIC upon receiving the hibernate signal, may power down the processor and power down itself at block 416 to transition the mobile device into the hibernate mode. By powering down the processor and the PMIC, and providing a low power rail to the hall sensor and the boot control circuit, the device may be able to conserve battery and use less power when compared to the suspend mode where both the processor and PMIC need to remain powered on and the device may consume higher power.

One or more operations of the method 400 may have been described above as being performed by the processor 202 or boot control circuit or device 206. It should be appreciated, however, that any of the operations of method 400 may be performed, at least in part, in a distributed manner by one or more other components. Further, the operations of method 400 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

Figure 5:
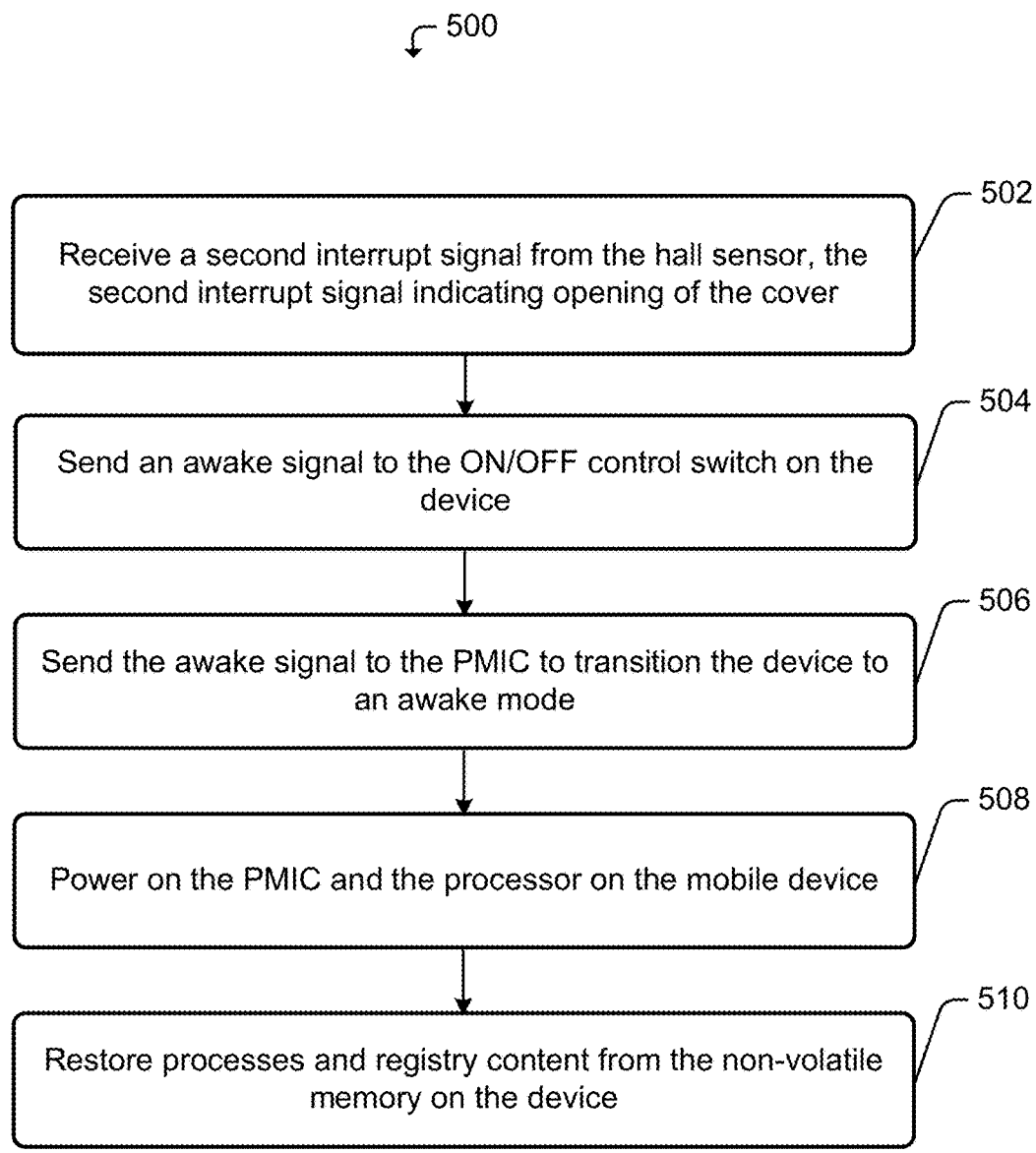
FIG. 5 is a process flow diagram of an illustrative method for transitioning a mobile device to an awake mode from a hibernate mode in accordance with one or more example embodiments of the disclosure.

FIG. 5 is a process flow diagram of an illustrative method for transitioning from a hibernate mode to an awake mode in a mobile device in accordance with one or more example embodiments of the disclosure. Referring to FIG. 5, the battery management module may continue to provide power to the cover sensor or hall sensor and the boot control circuit in the hibernate mode. At block 502, when the cover of the device is opened, the hall sensor sends a logical input or interrupt signal to the boot control circuit. At block 504, the boot control circuit may send an awake signal to the ON/OFF control switch on the device, which signal is then passed on the PMIC to transition the device to an awake mode at block 506. At block 508, the PMIC upon receiving this awake signal, turns on power to the processor and all other components that require to be powered on in an awake mode of the device. At block 510 the processor may restore all saved processes and registry content from the non-volatile memory and bring the device to a normal awake or read mode via a quick boot. The difference between the quick boot of the disclosure and a normal boot being, the processor in the case of a quick boot is able to retrieve all saved processes and registry content from the non-volatile memory on the device. However, in a normal boot, which may take up to or more than 30 seconds, the processor has to initiate all processes from start, including the kernel applications.

One or more operations of the method 500 may have been described above as being performed by the processor 202 or control circuit 206. It should be appreciated, however, that any of the operations of method 500 may be performed, at least in part, in a distributed manner by one or more other components. Further, the operations of method 500 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 5 may be performed.

Figure 6:
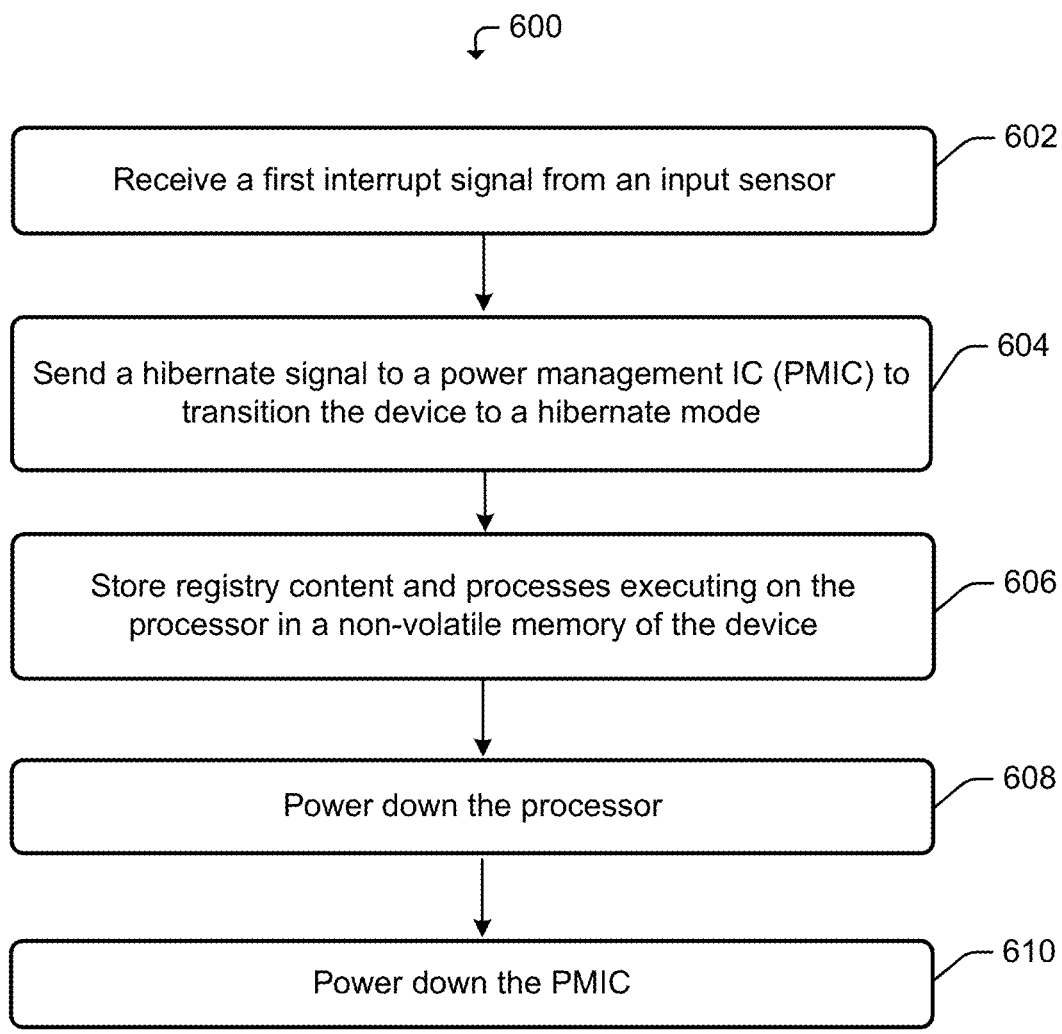
FIG. 6 is a process flow diagram of an illustrative method for transitioning a mobile device into a hibernate mode in accordance with one or more example embodiments of the disclosure.

FIG. 6 is another process flow diagram of an illustrative method for providing a hibernate mode without a suspend mode in a mobile device in accordance with one or more example embodiments of the disclosure. Referring to FIG. 6, at block 602, the processor of the device may receive an input or interrupt signal from an input sensor, which may be the hall sensor described above, or any other input sensor known to one of skill in the art including but not limited to an accelerometer, an optical sensor, an ambient light sensor, a camera device, a capacitive sensor, an audio sensor, or a digital output sensor. At block 604, the processor may send, upon receiving the input from the sensor, a hibernate signal to a power management module to transition the device to a hibernate mode. The power management module may include, for example, the battery management module, the PMIC, and the ON/OFF switch controller described in any of the previous embodiments. At block 606, the processor upon receiving this hibernate signal, may store or save the processes running on the processor and the registry content of the memory data register in a non-volatile memory on the device to enable a quick boot. The difference between the quick boot of the disclosure and a normal boot being, the processor in the case of a quick boot is able to retrieve all saved processes and registry content from the non-volatile memory on the device. However, in a normal boot, which may take up to or more than 30 seconds, the processor has to initiate all processes from start, including the kernel applications. At block 608, the device may transition into an hibernate mode by powering down the processor and PMIC that supplies power to the processor at block 610. It should be noted that in this example embodiment, the device may be capable of transitioning into the hibernate mode directly by not entering a suspend mode. This feature may be enabled either by a user setting on the device or based on a usage pattern of the device or a factory setting as desired.

One or more operations of the method 600 may have been described above as being performed by the processor 202 or control circuit 206. It should be appreciated, however, that any of the operations of method 600 may be performed, at least in part, in a distributed manner by one or more other components. Further, the operations of method 600 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 6 may be performed.

B. Wakeup Using Motion Sensor

FIGS. 7A and 7B are a schematic diagram and graph of an example embodiment illustrating a transition from one operational mode to another and a corresponding reduction in activation time to wakeup a mobile device 700 from a hibernation mode, in accordance with embodiments disclosed herein. More specifically, a graph 702 in FIG. 7B shows a decrease in the activation time as the device 700 transition from a hibernation mode to a partial awake mode, and then to an awake mode in accordance with the embodiments described herein. Typically, a device, such as the mobile device 700, for example, an e-reader, a smartphone, a tablet, a phablet, or any variation thereof, may take between 6 and 7 seconds to transition from a hibernation mode to an active mode where it is capable of responding to a user's input. In comparison, the time required to bring the device 700 out of a hibernation mode to an active or activation mode may be reduced by beginning the transition based on a detected motion of the device, resulting in a much faster device reaction time as well an improved user experience. For example, by beginning the transition from the hibernation mode to the active mode when a user picks up the device from a table, for example, based at least in part on detecting the motion, by the time the user activates the device, such as by pressing or touching an on/off button or feature, the device is already awake (or almost awake) and able to immediately transition to an active mode for use, which may include activating the display and/or other functions of the device. This transition of device 700 from hibernation mode to active mode as illustrated by line 704 in the graph 702 provides or a much quicker device activation upon the selection of the power button by a user (that is, less delay), as compared to the transition from hibernation mode to the active mode by a second device not including the wakeup sensor and validation sensor in accordance with embodiments of the disclosure, as illustrated by line 706. As shown in FIG. 7B, the power button on both devices are depressed at the same time, but the device without the wakeup sensor and validation sensor takes much longer, perhaps on the order of 2-6 second longer) to reach the active mode, as depicted by line 706.

In accordance with this example embodiment, the device 700 may have a hibernation mode, a partial awake mode, an awake mode, and an active mode. In a hibernation mode, the processor of the device may be powered down and the only components receiving power may be a motion sensor of the device and a PMIC that may receive a nominal amount of power to simply power a real time clock. In a partial awake mode, the processor may receive a small amount of power to execute a bootloader program to power one or more components operating as validation indicators, such as a capacitive touch sensor or a proximity sensor. In the active mode, all components of the device may be powered on and awaiting the user to turn on the device, such as by pressing or selecting the on/off button or feature.

In accordance with an illustrative example of the disclosure, the device 700 may begin in a hibernation mode, during which mode the activation time is at its maximum. In this mode, a PMIC of the device 700 may power down a processor and other components of the device to reduce power usage. However, a motion sensor, such as an accelerometer, of the device may be in communication with a low power boot control circuit, both of which may be powered on while in the hibernation mode. The motion sensor may, for example, detect any sort of motion or movement that the device 700 may undertake (for instance, shaking, jiggling, bobbing, etc.). For example, the user may pick up the device 700 from a table or a counter intending to use the device. However, there may be times where the motion detected by the motion sensor is not indicative of the user intending to use the device 700, but is unrelated to a pending or imminent use of the device 700. For example, a user may be transporting the device 700 in a bag (for instance, a backpack, a purse, a computer bag, or the like), or the device may be in a moving vehicle. To avoid false activation of the device from the hibernation mode based on such inadvertent motion of the device unrelated to an intent of the user to use the device, which may result in undesirable consumption of power, particularly if repeated, the device 700 may include a validation sensor, such as a capacitive touch sensor or a proximity sensor, that generates a validation signal confirming or at least suggesting that the user is actually about to activate the device 700, that is, turn it on. Without the validation signal, it may be determined that the user is not likely to turn on the device, and the device 700 may return to the hibernation mode.

When motion is detected by the motion sensor, whether indicative of imminent use or not, the device 700 may initiate the wakeup of the device by beginning to transition the device to a partial wakeup mode. In this partial wakeup mode, the device 700 may power a validation sensor, such as a capacitive touch sensor or a proximity sensor, to detect the touch or proximate presence of the user. For example, the user may have the device in hand, and may touch a capacitive touch sensor on the device, such as on a back cover or housing, or a capacitive touch integral to a touch display of the device 700. Similarly, a proximity sensor on the device 700 may also detect the user. In some embodiments, the validation sensor may be, for example, a Hall sensor associated with a cover of the device, as discussed above, an optical sensor that detects a gaze of the user toward the device, or an audio sensor that detects a trigger word or utterance. A validation signal generated by the validation sensor may be received by the processor of the device 700, which may cause the device 700 to continue powering up to the awake mode.

In the active mode, the activation time is negligible, from virtually instantaneous to 2-3 seconds, which is a significant reduction in activation time when powering up the device from the hibernation mode, as illustrated by the graph 702. If however, the user does not activate the device while the device is in the awake mode within a predetermined period of time, such as 5-15 seconds, the device may return to the hibernation mode, either directly or following a period in a suspend mode. If the device detects motion and an validation signal several times within a short period of time without the user activating the device, such as if the user were carrying the device 700 in hand while walking, the device 700 may discontinue the wakeup process, such as by disabling the motion sensor to avoid the consumption of power used to power up the device unnecessarily.

Figure 8:
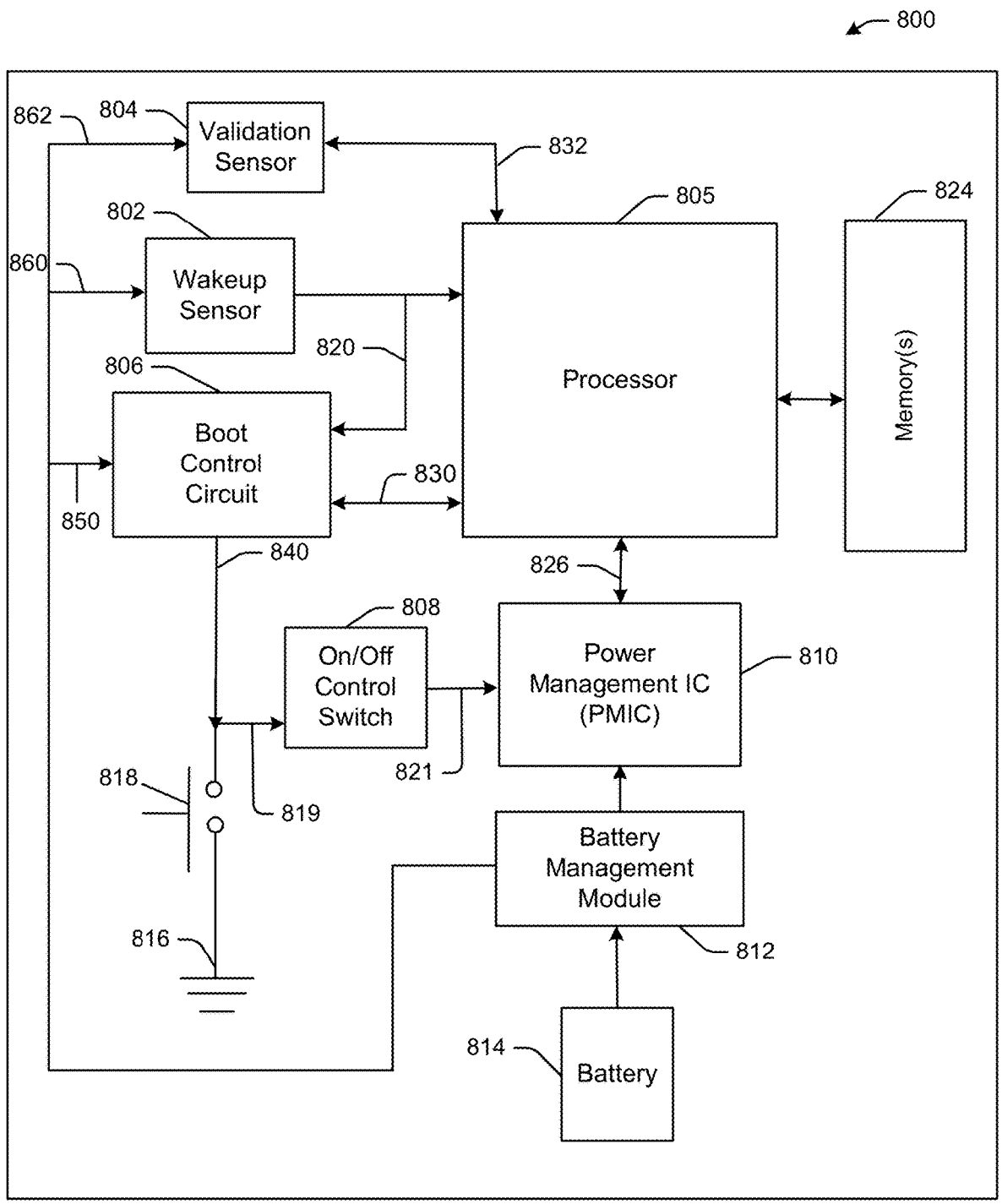
FIG. 8 is a schematic diagram of an illustrative mobile device in accordance with one or more example embodiments of the disclosure.

FIG. 8 illustrates an example system diagram of a mobile device 800 (similar to that illustrated as device 700 in FIG. 7), according to one or more example embodiments. The mobile device 800 may include one or more processors 805 that may be powered by a power management integrated circuit (PMIC) 810, which may receive power from a battery management module 812. The battery management module 812 may be connected to a battery 814, which may act as source of power to the device 800. The battery 814 may include any battery suitable for the purpose, including but not limited to Lithium ion batteries, Lithium polymer batteries, and NiCad batteries. The battery management module 812 may provide power to the PMIC as well as the other components on the device. Although the battery management module 812 and the PMIC 810 are illustrated as being two separate components in FIG. 8, they may both be part of the same chip. The PMIC 810 may be an integrated circuit for managing the power requirements of various components of the device 800 and managing the power distribution in the device 800. The PMIC 810 may be a solid state device that may control the flow and direction of electrical power within the device 800. The PMIC 810 may provide high efficiency power conversion that may minimize energy loss or heat loss. The PMIC 810 may have one or more functions, including but not limited to DC to DC conversion, battery charging, power-source selection, voltage scaling, power sequencing, or other miscellaneous functions. The PMIC 810 may also include battery management, voltage regulation, and charging functions. It may include a DC to DC converter to allow dynamic voltage scaling. The PMIC 810 may use pulse-frequency modulation (PFM) or pulse-width modulation (PWM).

The device 800 may include one or more power buttons 818 grounded at 816, which may be operatively coupled to an ON/OFF button on the device to receive inputs from a user. The user inputs via the power button 818 may cause the mobile device to transition from one mode to the other, such as transitioning from an awake mode to a hibernation mode or from a hibernation mode to an awake mode by, for example, pressing or otherwise actuating the power button 818. The power button 818 may be operatively coupled with an ON/OFF control switch 808 on the mobile device, which may take the signal on line 819 as input and generate an output on line 821, which may be communicated as a logical signal input to the PMIC 810.

The mobile device 800 may also include a wakeup sensor 802, such as a motion sensor, which may be able to detect movement of the mobile device 800. In one example, the wakeup sensor 802 may be an accelerometer. Additionally, or alternatively, the wakeup sensor 802 may be an optical sensor, an ambient light sensor, a camera device, a hall sensor, a capacitive sensor, a wearable device coupled to and/or in communication with the device (for example, ear buds with capacitive touch sensors, headphones, watches, glasses, physical monitors, medical devices, etc.), an audio sensor, or any sensor with a digital output. In some examples, two or more wakeup sensors 802 may be used in combination, where two or more sensors detect a wakeup. This may be use, for example, when one or more false wakeups have been occurred, and a more robust wakeup detection is needed. In such circumstance, having two or more wakeup sensors respond at the same time (or nearly the same time, or in a certain sequence) to cause to generate a wakeup signal may reduce the likelihood of a false wakeup.

The one or more processors 805 (also referred to as processor 805) may be in communication with one or more memories 824, which may include one or more volatile memories and one or more non-volatile memories. Memory 824 may store one or more processes which may be executed by the processor 805.

The mobile device 800 may also include a validation sensor 804 for detecting a validation signal or indicator such as the touch of a user or the proximity of a user. In one example, the validation sensor may be a capacitive touch sensor or a proximity sensor. Additionally, or alternatively, the validation sensor 804 may be an optical sensor, an ambient light sensor, a camera device, a Hall sensor, a capacitive sensor, a wearable device coupled to and/or in communication with the device (for example, ear buds with capacitive touch sensors, headphones, watches, glasses, watches, physical monitors, medical devices, etc.), an audio sensor, or any sensor with a digital output.

The validation sensor 804 may be located anywhere on the device. In one example, the validation sensor may be positioned on an external cover or housing of the mobile device. In yet another example, the validation sensor may be located on the edge of the mobile device or along a bezel of the display of the device, or in some embodiments may be the capacitive touch sensor of a touch display of the device. For example, when the user opens the cover of the mobile device 800 (or picks up the mobile device without a cover), a touch of an validation sensor positioned along the outer edge of the device may trigger the validation sensor. For example, the user often touches the screen while picking up the mobile device. By placing, for example, a capacitive touch sensor anywhere on the screen of the mobile device, the user input may register and trigger a continued wakeup of the mobile device. In yet another example, the more than one validation sensor 804 may be utilized so that the signals from two or more validation sensors may be used to generate a validation signal. For example, a capacitive touch sensor detecting a touch by a user and an audible sensor detecting a trigger word may both be required to cause the transition of a device to an awake mode. This may be use, for example, when one or more false wakeups and/or validations have been occurred, and a more robust validation is needed. In such circumstance, having two or more validation sensors that at the same (or nearly the same time, or in a certain sequence) detect a signal may reduce the likelihood of a false wakeup.

According to one or more example embodiments, the battery management module 812 may provide power to the wakeup sensor 802 and a low power boot control circuit or device 806 via low voltage power rails 860 and 850, respectively. In addition, the battery management module 812 may provide power to the validation sensor 804 via the low voltage power rail 862, though such power may be provided selectively, such as in certain embodiments where it may not be provided in the hibernation mode. The boot control circuit 806 may be an analog or digital circuit that may be able to receive and process an output from the wakeup sensor 802. An illustrative example of a the boot control circuit is illustrated in FIG. 3 and is described in the accompanying text. The boot control circuit 806 may be operatively coupled to the wakeup sensor 802 such that the boot control circuit may relay the signal received from the wakeup sensor 802 via line 820 to the On/Off control switch 808 via line 840. The boot control circuit 806 may also be operatively coupled to the processor 805 such that it may send and/or receive one or more general purpose input/output signals from the processor 805 via line 830 while the processor is powered on.

In accordance with an embodiment of the disclosure, the mobile device 800 may include hardware, software, or a combination thereof that provides for a quick boot (also referred to herein as a "power up") of the mobile device 800 from the hibernate mode prior to the user pressing the "on" button. The quick boot takes the device from the hibernation mode to the awake mode in a manner that is imperceptible to the user, in anticipation of the user using the device, thereby providing a better user experience because the activation time is significantly reduced, such as by 2-5 seconds, since the device is already in an awake mode when the user activates the device (for example, presses the "on" button). In an example embodiment, the detection of movement of the device by a wakeup sensor, followed by the detection of a validation signal, such as a touch of the device by the user, by a validation sensor may result in the device transitioning from a hibernation mode to an awake mode before the user activates the device, while avoiding false activations initiated by the wakeup sensor.

In the hibernation mode, in an example embodiment, the battery management module 812 continues to provide power to the motion sensor 802 and the boot control circuit 806. When motion is detected, the wakeup sensor 802 sends a logical input or signal to the boot control circuit 806. The boot control circuit 806 receives the input from the wakeup sensor 802 and sends an awake signal to the ON/OFF switch 808 via line 840. The awake signal is then passed on to the PMIC 810 to turn partial power on for the device 800, specifically, to the processor 805. The PMIC 810, upon receiving this awake signal, turns on partial power to the processor 805 as needed to execute a boot script, such as the bootloader in a low power mode. The processor 805 has limited power at this point, preferably just enough to initiate the boot loader program and activate the validation sensor(s) 804. In some embodiments, the PMIC 810 may not fully power up the device 800 upon receipt of the awake signal under the control of the processor 805 via line 826. The processor 805 may determine a validation signal has not been detected so the transition to the awake mode is suspended, until a validation signal is received. The processor 805 may include a timer that either waited a period of time for the validation signal or that polls the validation sensor for a validation signal a certain number of times, before returning the device 800 to the hibernation mode. A counter of the processor 805 may track the number of times the wakeup sensor generates a wakeup signal where there is no corresponding validation signal, for instance, within a predetermined period of time, and may disable the wakeup sensor for a period of time to conserve power. Further, during the partial wakeup mode, the processor 805 may control the PMIC 810, and thus the battery management module 812, concerning which components to power up. For example, in some embodiments of the validation sensor 804, power may be provided to the validation sensor 804 during the partial wakeup mode by the battery management module 812 via line 862. Alternatively, the processor 805 may provide the power to the validation sensor 804. The validation sensor 804 is in communication with the processor 805 via line 832, for sending and receiving operational data, such as a validation signal or indication. This mode of operation is generally referred to as the partial wakeup mode, during which time the processor 805 is monitoring the validation sensor 804 for a validation signal.

In some embodiments, upon receipt of a validation signal, by the processor 805, the transition to the awake mode is resumed, wherein all other components that are to be powered on in an awake mode of the device receive power, and the processor 805 fully powers on into an awake mode. In this mode, the device may appear off to the user, but upon the user turning the device on (activating the device), the device is able to immediately turn on its display and begin engaging in operation, with little to no delay. This provides an enhanced user experience because the user does not need to wait for the device to power up. In the awake mode, the processor 805 may use a time to determine if the user activates the device within a predetermined window, say 5-15 seconds of the wakeup signal or the validation signal. In no activation is detected, the device 800 may return to a hibernation mode, perhaps after a period in a suspend mode. Similar to the use of the counter above, if the device 800 detects a wakeup signal and a validation signal multiple times without a user activation, then the device may return to the hibernation mode and disable the wakeup sensor for a period of time to conserve power.

Figure 9:
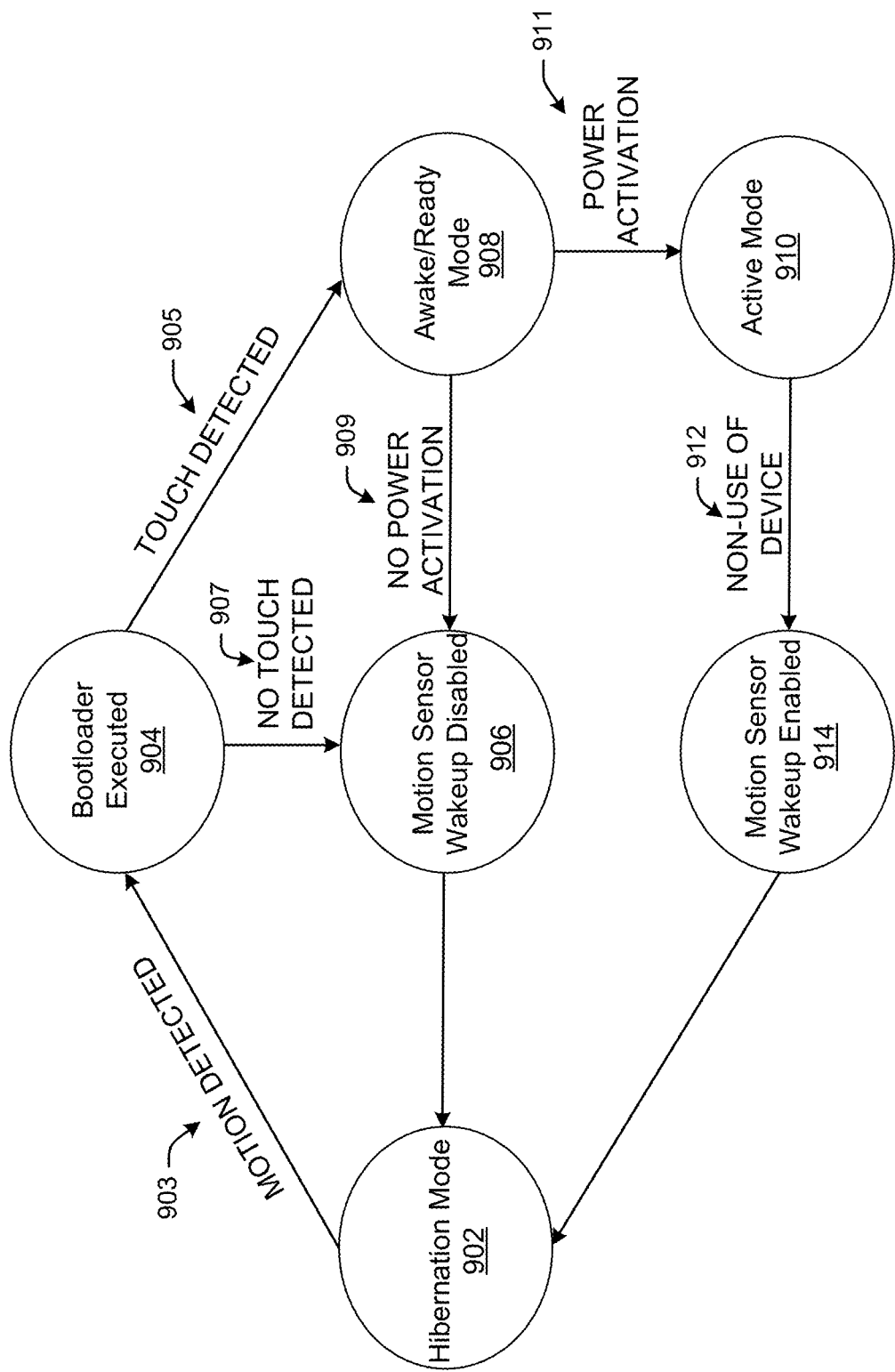
FIG. 9 is a state diagram illustrating one or more states to transition a mobile device from a hibernation mode to an awake mode in accordance with one or more example embodiments of the disclosure.

FIG. 9 is a state diagram illustrating one or more states that a mobile device may transition between in accordance with one or more example embodiments of the disclosure. Referring to FIG. 9, the device, such as mobile 700 or 800, as described herein, may be in a hibernation state 902. The hibernation state 902 may be an almost complete power off state, where little to no power is being consumed by the device. In one example, the only component of the device that may be powered on is a wakeup sensor, such as a motion sensor. The wakeup sensor may detect movement 903 of the device. The motion detected by the wakeup sensor may include, without limitation, a user picking up the device, the mobile device being placed in a bag and transported, or the like. In one example, the transport may result in the mobile device jiggling or shaking.

If motion of the mobile device is detected, then the wakeup sensor may send a signal to a boot control circuit (such as boot control circuit 206, 806 of FIGS. 2 and 8, respectively) to initiate the transition to a partial wakeup state, which may include the execution of a boot script, such as the bootloader program at state 904. In this state, the only component powered up may be the validation sensor, in addition to the processor operating at a low power level.

In one example, the validation sensor may be a capacitive touch sensor. Alternatively and/or additionally, the validation sensor may be a proximity sensor configured to detect if a person is within a pre-established distance (for instance, 5 cm, 10 cm, 15 cm, etc.) of the device. The validation sensor may confirm that the user intends to power up the mobile device (for example, by touch or proximity). Thus, the detection of a validation signal or indicator by the validation sensor, such as a touch 905, may indicate that the user did in fact intend to wake up the mobile device for use, while a failure to detect a validation signal or indicator by the validation sensor may signal a false wakeup signal from the wakeup sensor. If detected, then the device resumes the transition to an awake/ready mode 908.

A timing threshold may be associated with the validation sensor to limit the amount of time the validation sensor may detect user input (for example, touch) before the device returns to the hibernation mode 902. In some examples, the validation sensor is enabled the instant the motion sensor signal is sent, such that the user input may be detected immediately following the wakeup sensor signaling the boot control circuit to wake up. Alternatively and/or additionally, the timing threshold may include a range of times typical for user input to be detected by the input sensor (for example, a range of 1 to 2 milliseconds, a range of 1 to 5 milliseconds, or any viable range) following the detection of movement of the wakeup sensor. Alternatively, the processor may poll or check the validation sensor a certain number of times for a validation signal.

If there is a failure to detect a validation signal (for example, no touch 907) by the validation sensor, the mobile device may transition to a state 906 where the wakeup sensor is disabled from generating a wakeup signal and the mobile device may return to the hibernation mode 902, either directly or after a period in a suspend mode. In one example, where the mobile device is returned to the hibernation mode 902, the motion sensor may be deactivated for a pre-established period of time. For example, if the wakeup sensor is deactivated as a result of a false wakeup, the wakeup sensor may be deactivated for 30 seconds, 1 minute, 2 minutes, 5 minutes, or any reasonable period of time. Alternatively and/or additionally, the wakeup sensor may be deactivated after a threshold number of false wakeups, perhaps within a predetermined period of time. For example, if the wakeup sensor initiates wakeup of the mobile device 1 time, 2 times, 3 times, or any reasonable number of times, without a validating signal from the validation sensor, then the wakeup sensor may be deactivated for a set period of time.

By way of yet another example, an amount of charge on the battery of the device may establish one or more parameters for the number of false wakeups within a pre-established time range. For example, where the mobile device is low on battery charge, the mobile device may reduce the number of wakeup signals sent by the wakeup sensor to trigger the wakeup sensor being disabled and/or the window of time within which the validation signal may be detected may be reduced and/or the period for which the wakeup sensor is disabled may be increased. For example, without limitation, where the battery charge is at 25% charge or less, the mobile device may set a threshold of two false wakeups every 2 minutes. In another embodiment, historical wakeup data for the device and/or other devices. Such historical wakeup date may be utilized with a learning algorithm to determine preferred or optimal periods, and such determination may take into consideration various parameters, for instance, the time of day, user configurable parameters, historical usage of the device, content on or available to the device, location of the device, historical motion models that can be mapped to certain actions (for example, running, driving, etc.), and more.

In addition, where multiple false wakeups are detected within a given period of time, the mobile device may adjust or determine the thresholds for the wakeup sensor from false wakeup to false wakeup. For example, if the mobile device is woken up (for instance, through the detection of motion sensed by the wakeup sensor) two times within the span of 5 seconds, each being a false wakeup (no validation signal), resulting in a disabled wakeup sensor for 2 minutes, then for the next false wakeup the mobile device may automatically disable the wakeup sensor for 5 minutes. Alternatively, the user of the mobile device may manually alter the parameters by which the wakeup sensor may wake up and activate.

If, at the awake/ready mode 908 there is no detection of the device being activated 909, then the wakeup sensor wakeup may be disabled 906 and the mobile device returns to the hibernation mode 902, either directly or after a period in a suspend mode. In one example, a failure to power up the device is the result of a false wakeup. For example, the user may have been carrying the mobile device in hand. The wakeup sensor of the mobile device may have detected the movement, and a validation sensor may detect the user's finger(s) touching the validation sensor. In this example, the motion detected by the wakeup sensor may have been a false wakeup.

Continuing with FIG. 9, the mobile device may transition from the awake/ready mode 908 to an active mode 910 upon the user activating the device, for example, turning on the power 911 by pressing the "On/Off" button. In active mode, the mobile device has been fully resumed from the hibernation mode 902 and is operating in a full power mode. Upon detection of a period of non-use for a predetermined period of time 912, for instance, 1 minute, 2 minutes, etc., the device may enable sensor wakeup 914 of the mobile device (note, the wakeup sensor and validation sensor may be disabled, at least for purposes of generating wakeup sensor signals or validation sensor signals, respectively, for purposes of wakeup or validation as discussed herein, when the device enters the activation mode, if not before). For example, at state 914, the motion sensor may be reset to ensure that upon the next wakeup sensor signal detection, the wakeup sensor is active to initiate the wakeup of the mobile device to resume the mobile device from hibernation to the active state.

Figure 10:
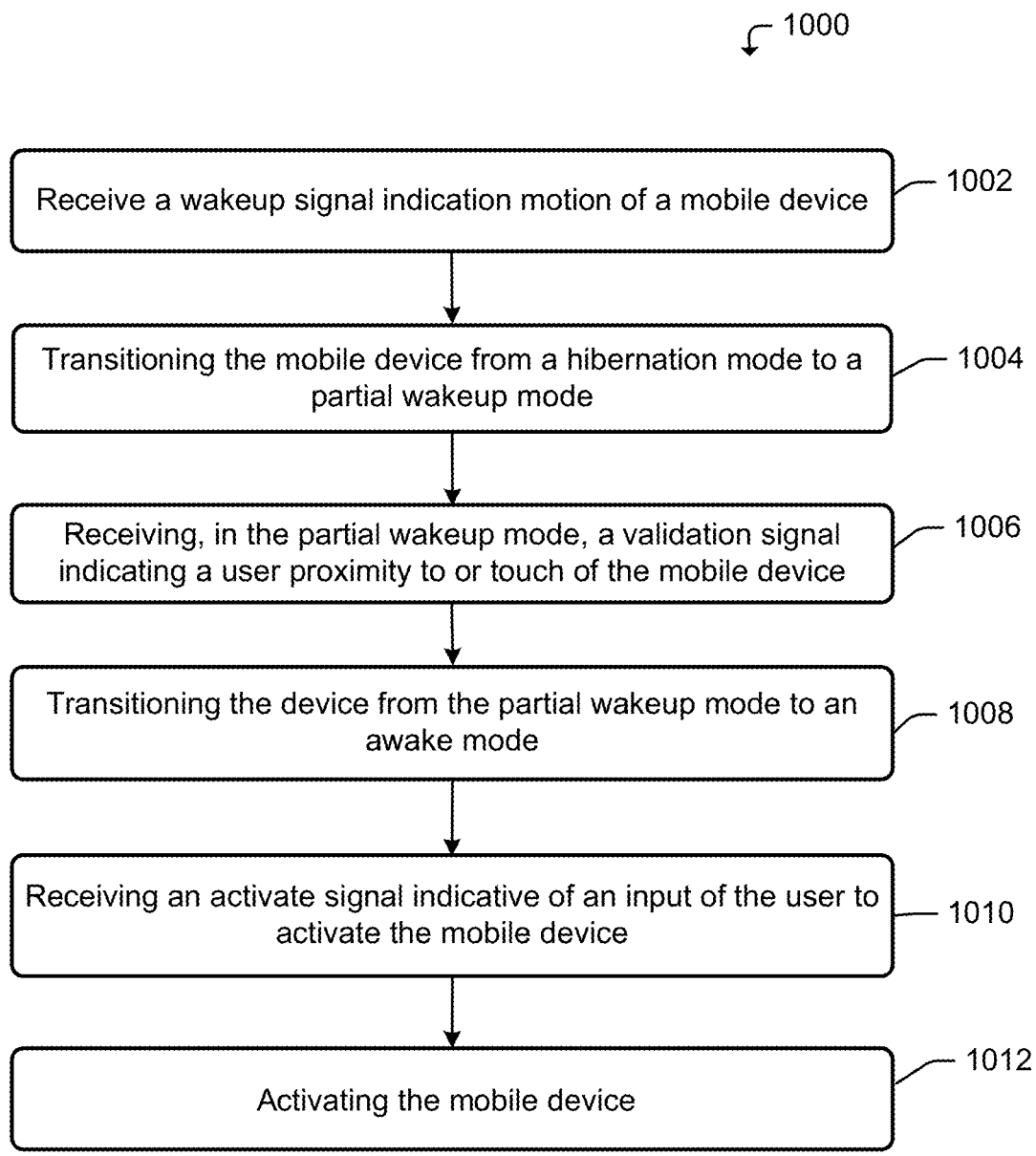
FIG. 10 is a process flow diagram of an illustrative method to wakeup a mobile device from a hibernation mode in accordance with one or more example embodiments of the disclosure.

FIG. 10 is a process flow diagram of an illustrative method for transitioning from a hibernation state to an activation state in accordance with one or more example embodiments of the disclosure. Referring to FIG. 10, at block 1002, a wakeup signal may be received from the wakeup sensor. In one example, the signal may indicate movement of the device, for example, the mobile device 700, 800. The movement detected by the motion sensor may include, without limitation, a user picking up the mobile device, the mobile device shaking (or bobbing, jiggling, or the like) in a bag (or vehicle), or any reasonable movement that may be registered by a motion sensor, such as the wakeup sensor 802. In one implementation, a detection of motion by the wakeup sensor initiates a transition of the mobile device from a hibernation mode to a partial wakeup mode, as block 1004. At block 1006, a validation signal from a validation sensor, such as the validation sensor 804, may be received. The validation signal may include or indicate, without limitation, a user's touch or the location of the mobile device to the user, identified by an input sensor such as a capacitive touch sensor or a proximity sensor, respectively. The validation sensor may confirm that the user did in fact intend to wake up and continue the activation of the mobile device. If a validation signal is detected, the process continues at block 1008 with resuming the transition of the device to the awake mode.

A timing threshold may be associated with the validation sensor to limit the amount of time a validation sensor may detect user input before returning to the hibernation mode. In some examples, the validation sensor is enabled the instant the motion sensor signal is sent, such that the user input must be detected immediately following the motion sensor. Alternatively and/or additionally, the timing threshold may include a range of time typical for user input to be detected by the input sensor (for example, a range of 1 to 2 milliseconds, a range of 1 to 5 milliseconds, or any viable range) following the detection of movement of the device. If no user validation signal is detected, the process may disable the wakeup sensor. For example, the failure to detect input by the validation sensor may signal a false wakeup signal from the wakeup sensor. The false wakeup signal may, without limitation, be the result of the wakeup sensor detecting movement that was not intended by a user to initiate activation of the mobile device. Thus, the mobile device may transition back to a hibernation mode. As discussed herein, while in the hibernation mode, the processor of the device may be powered down and the only components receiving power may be the motion sensor in the device and a small amount of power supplied to the PMIC powering a real time clock.

If however, a activation signal is detected at block 1010, for example, by pressing the "On/Off" button of the device, then the device is activated at block 1012. In yet another example, the power may be activated by simply opening the cover of the mobile device. If the power is not activated, the process may transition the device back to the hibernation mode, and in some circumstances, disable the wakeup sensor for a predetermined period of time.

Figure 11:
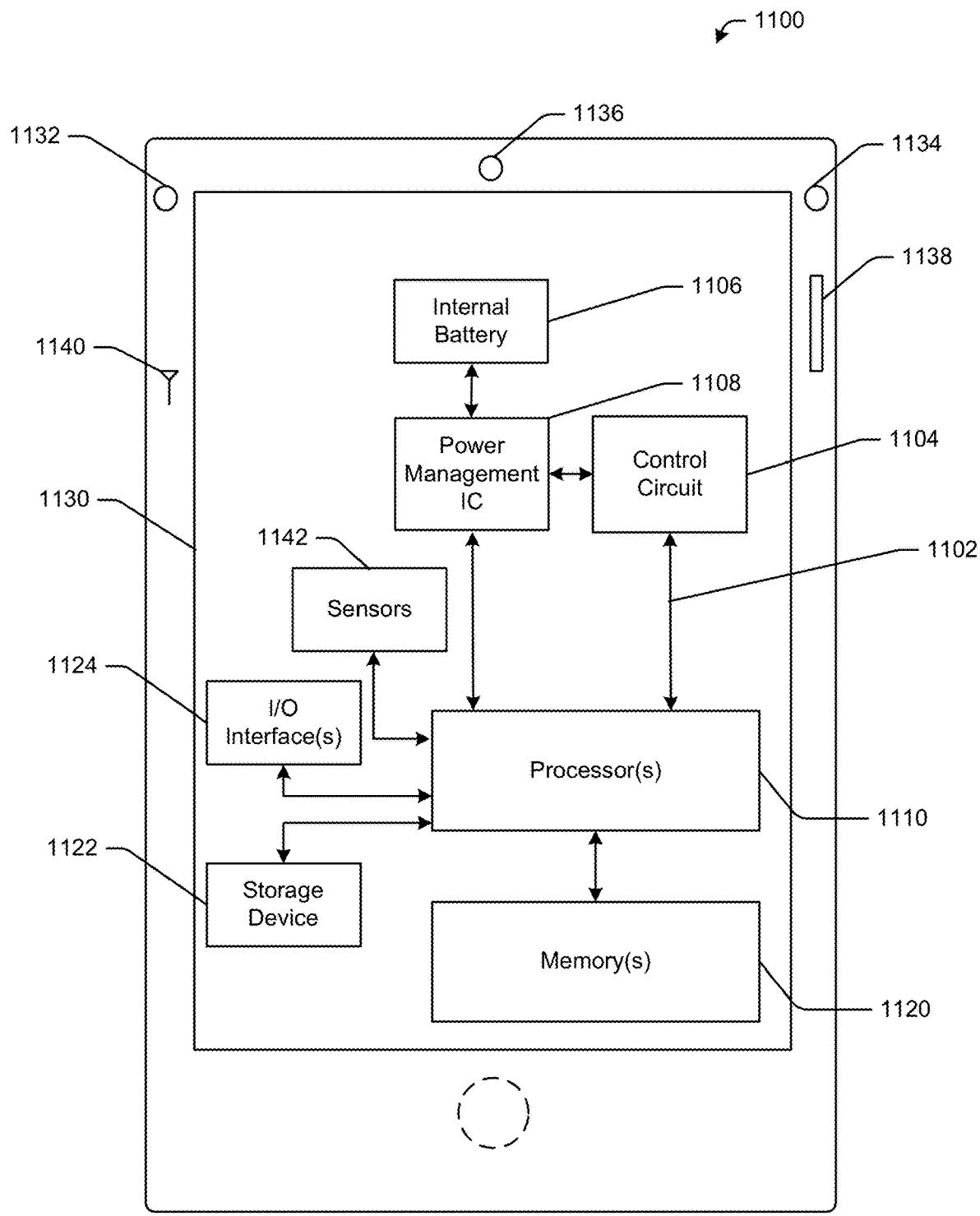
FIG. 11 is a diagram of an illustrative physical implementation of a mobile device in accordance with one or more example embodiments of the disclosure.

FIG. 11 is a schematic diagram illustrating an example user device 1100 with a control circuit 1104 similar to the low power boot control circuits or devices 206, 806 described in the above example embodiments. In operation, the user device 1100 may include computer-readable and computer-executable instructions that reside on the user device 1100, as is discussed further below. The user device 1100 may include an address/data bus 1102 for conveying data among components of the user device 1100. Each component within the user device 1100 may also be directly connected to other components in addition to (or instead of) being connected to other components across the bus 1102. User device 1100 may include an internal battery 1106 which may provide power to a power management IC 1108. The power management IC 1108 may distribute power to various components of the user device 1100 including one or more processors 1110 and the control circuit 1104. The internal battery 1106 may be similar to the batteries 214, 814 described in FIG. 2 and in FIG. 8, and the power management IC may be similar to PMICs 210, 810 described in FIG. 2 and FIG. 8, respectively.

The control circuit 1104 may be included within the user device 1100, such as a mobile communications device, a personal electronic device, or any portable electronic device. The user device 1100 may include, but is not limited to, a personal computer, a desktop computer, a notebook computer, a laptop computer, a personal digital assistant, an electronic book (e-book) reader, a tablet computing device, a pad computing device, a smartphone, wearable devices, or combinations thereof. The user device 1100 may include one or more application processor(s) 1110 and/or memory(s) 1120.

In some example embodiments, the processors 1110 of the user device 1100 may be implemented as appropriate in hardware, software, firmware, or combinations thereof. Software or firmware implementations of the processors 1110 may include computer-executable or machine-executable instructions written in any suitable programming language to perform the various functions described. Hardware implementations of the processors 1110 may be configured to execute computer-executable or machine-executable instructions to perform the various functions described. The one or more processors 1110 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 1100 may also include a chipset (not shown) for controlling communication between the one or more processors 1110 and one or more of the other components of the user device 1100. The one or more processors 1110 may also include one or more application specific integrated circuits (ASICs) or application specific standard products (ASSPs) for handling specific data processing functions or tasks.

The memory/storage 1120 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, non-volatile magnetoresistive (MRAM), or combinations thereof.

The memory 1120 may store program instructions that are loadable and executable on the processor(s) 1110, as well as data generated or received during the execution of these programs. The memory 1120 may include one or more operating systems (O/S) and one or more application software that may be executed by the processors 1110 to control the user device 1100 and the control circuit 1104. The memory 1120 may also provide temporary "working" storage at runtime for any applications being executed on the processors(s) 1110. The computer instructions may be stored in a non-transitory manner in non-volatile memory 1120, storage 1122, or an external device. Alternatively, some or all of the executable instructions may be embedded in hardware or firmware in addition to or instead of software.

The user device 1100 may include input/output device interfaces 1124. A variety of components may be connected through the input/output device interfaces 1124, such as a display or display screen 1130 having a touch surface or touchscreen, an audio output device for producing sound, such as speaker(s) 1132, one or more audio capture device(s), such as a microphone or an array of microphones 1134, one or more image and/or video capture devices, one or more haptic units 1138, and other components. The display 1130, speaker(s) 1132, microphone(s) 1134, haptic unit(s) 1138, and other components may be integrated into the user device 1100 or may be separate.

The display 1130 may be a video output device for displaying images. The display 1130 may be a display of any suitable technology, such as a liquid crystal display, an organic light emitting diode display, electronic paper, an electrochromic display, a cathode ray tube display, a pico projector or other suitable component(s). The display 1130 may also be implemented as a touchscreen and may include components such as electrodes and/or antennas for use in detecting stylus input events or detecting when a stylus is hovering above, but not touching, the display 1130.

The input/output device interfaces 1124 may also include an interface for an external peripheral device connection such as universal serial bus (USB), FireWire, Thunderbolt, Ethernet port or other connection protocol that may connect to one or more networks. The input/output device interfaces 1124 may also include a connection to one or more antennas 1140 to connect one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The user device 1100 may be any suitable electronic device such as, for example, a desktop or laptop PC, a smartphone, a digital personal assistant, a tablet, a wearable computing device, or the like. In certain example embodiments, the user device 1100 may include one or more antennas 1140 including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The battery may be any suitable type of battery including, but not limited to, any Li-ion or Li-based battery. Packaging material for the battery may include, without limitation, various tri-laminated combinations of aluminum, graphene, nylon and PET or other hermetic and sealable packaging materials or combinations thereof.

Referring now to other components of the device 1100, the bus(es) may include at least one of a system bus, a memory bus, an address bus, or a message bus, and may permit exchange of information (e.g., data (including computer-executable code), signaling, etc.) between various components of the user device 1100. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory(s) 1120 of the device 1100 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1120 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1120 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage device 1122 may include removable storage and/or non-removable storage including, but not limited to, magnetic storage, optical disk storage, solid-state storage, and/or tape storage. The data storage 1122 may provide non-volatile storage of computer-executable instructions and other data. The memory 1120 and the data storage 1122, removable and/or non-removable, are examples of computer-readable storage media (CRSM) as that term is used herein.

The data storage 1122 may store computer-executable code, instructions, or the like that may be loadable into the memory 1120 and executable by the processor(s) 1110 to cause the processor(s) 1110 to perform or initiate various operations. The data storage 1122 may additionally store data that may be copied to memory 1120 for use by the processor(s) 1110 during the execution of the computer-executable instructions. Moreover, output data generated as a result of execution of the computer-executable instructions by the processor(s) 1110 may be stored initially in memory 1120, and may ultimately be copied to data storage 1122 for non-volatile storage.

More specifically, the data storage 1122 may store one or more operating systems (O/S) and one or more applications, program modules, or the like. Any applications stored in the data storage 1122 may be loaded into the memory 1120 for execution by the processor(s) 1110. Further, any data (not shown) stored in the data storage may be loaded in to the memory 1120 for use by the processor(s) 1110 in executing computer-executable code.

The processor(s) 1110 may include any suitable processing unit capable of accepting data as input, processing the input data in accordance with stored computer-executable instructions, and generating output data. The processor(s) 1110 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1110 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1010 may be capable of supporting any of a variety of instruction sets.

Referring now to other illustrative components depicted as being stored in the data storage 1122, the O/S may be loaded from the data storage 1122 into the memory 1120 and may provide an interface between application(s) executing on the user device 1100 and hardware resources of the user device 1100. More specifically, the O/S may include a set of computer-executable instructions for managing hardware resources of the user device 1100 and for providing common services to application programs (e.g., managing memory allocation among various application programs). The O/S may include any operating system now known or which may be developed in the future including, but not limited to, any server operating system, any mainframe operating system, or any other proprietary or non-proprietary operating system.

The input/output (I/O) interface(s) 1124 may facilitate the receipt of input information by the user device 1100 from one or more I/O devices as well as the output of information from the user device 1100 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the user device 1100 or may be separate. The I/O devices may further include, for example, any number of peripheral devices such as data storage devices, printing devices, and so forth.

The I/O interface(s) 1124 may also include an interface for an external peripheral device connection such as universal serial bus (USB), FireWire, Thunderbolt, Ethernet port or other connection protocol that may connect to one or more networks. The I/O interface(s) 1124 may also include a connection to one or more of the antenna(s) 1140 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The user device 1100 may further include one or more network interfaces via which the device 1100 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The sensor(s) 1142 may include or may be capable of interfacing with any suitable type of sensing device such as, for example, ambient light sensors, inertial sensors, force sensors, thermal sensors, image sensors, magnetometers, capacitive touch sensors, proximity sensors, Hall sensors, optical sensors, and so forth. Further example types of inertial sensors 1142 may include accelerometers (e.g., MEMS-based accelerometers), gyroscopes, and so forth.

The antenna(s) 1140 may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers or radio components (not shown) to which or from which signals may be transmitted or received.

As previously described, the antenna(s) 1140 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1140 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 7 GHz channels (e.g. 802.11n, 802.11ac), or 60 GHZ channels (e.g. 802.11ad). In alternative example embodiments, the antenna(s) 1140 may be configured to transmit or receive radio frequency signals within any suitable frequency range forming part of the unlicensed portion of the radio spectrum.

The antenna(s) 1140 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) may include any suitable radio component(s) for—in cooperation with the antenna(s) 1140—transmitting or receiving radio frequency (RF) signals in the bandwidth and/or channels corresponding to the communications protocols utilized by the user device 1100 to communicate with other devices. The transceiver(s) may include hardware, software, and/or firmware for modulating, transmitting, or receiving—potentially in cooperation with any of antenna(s) 1140—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) may further include hardware, firmware, or software for receiving GNSS signals. The transceiver(s) may include any known receiver and baseband suitable for communicating via the communications protocols utilized by the user device 1100. The transceiver(s) may further include a low noise amplifier (LNA), additional signal amplifiers, an analog-to-digital (A/D) converter, one or more buffers, a digital baseband, or the like.

It should be appreciated that the user device 1100 may include alternate and/or additional hardware, software, or firmware components beyond those described or depicted without departing from the scope of the disclosure. More particularly, it should be appreciated that software, firmware, or hardware components depicted as forming part of the user device 1100 are merely illustrative and that some components may not be present or additional components may be provided in various embodiments.

Various other changes and modifications to the embodiments herein chosen for purposes of illustration will readily occur to those skilled in the art. For example, certain materials for the purposes of bonding and/or castellated contact formation were described, but other materials may also be effective. Further additional intervening layers may be able to be provided while still benefiting from the explained embodiments. Examples were described to aid in understanding. Thus, it was not intended that these examples were the only examples. To the extent that such modifications and variations do not depart from the spirit of the invention, they are intended to be included within the scope thereof. It will be readily understood to those skilled in the art that various other changes in the details, material, and arrangements of the parts and method stages which have been described and illustrated in order to explain the nature of this disclosure may be made without departing from the principles and scope of the disclosure.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An electronic reader (e-reader) device, comprising:
an accelerometer that detects movement of the e-reader device;
a capacitive touch sensor disposed on an external surface of the e-reader device;
at least one memory storing computer-executable instructions; and
a processor configured to access the at least one memory and execute the computer-executable instructions to:
receive a first wakeup signal from the accelerometer, the first wakeup signal indicating first movement of the e-reader device;
initiate a first transition of the e-reader device from a hibernation mode to a partial awake mode;
determine, when the e-reader device is in the partially awake mode, that the capacitive touch sensor has not been activated within a first period of time;
initiate, after the first period of time, a second transition of the e-reader device from the partial awake mode to the hibernation mode;
disable the accelerometer for a second period of time following the first period of time;
enable the accelerometer following the second period of time;
receive, after the second period of time, a second wakeup signal from the accelerometer, the second wakeup signal indicating a second movement of the e-reader device;
initiate a third transition of the e-reader device from the hibernation mode to the partial awake mode;
receive, from the capacitive touch sensor within a third period of time after the second period of time, a validation signal indicating a touch input;
initiate a fourth transition of the e-reader device from the partial awake mode to an awake mode;
determine a user input to activate the e-reader device; and
activate the e-reader device.

2. The e-reader device of claim 1, wherein the processor is further configured to execute the computer-executable instructions to:
determine a threshold of non-use of the e-reader device is satisfied;
initiate a fifth transition of the e-reader device from an active mode to the hibernation mode; and
enable the accelerometer.

3. The e-reader device of claim 1, wherein the hibernation mode comprises a first device state where the accelerometer is powered while a remainder of the e-reader device is powered off, and the partially awake mode comprises a second device state where the capacitive touch sensor is powered and a processor of the e-reader device is executing a boot script.

4. A method, comprising:
receiving a first signal indicating motion of a mobile device;
providing power to a validation sensor of the mobile device;
transitioning the mobile device from a hibernation mode to a partial awake mode, wherein a processor of the mobile device operates in a low power mode;
determining at least one of: (i) a user is not present within a proximity of the mobile device, or (ii) the mobile device did not receive a first touch input within a first period of time;
transitioning the mobile device from the partial awake mode to the hibernation mode;
receiving a second signal indicative of user input to the mobile device; and
activating the mobile device after receiving the second signal.

5. The method of claim 4, wherein the first signal is received from a motion sensor, and further comprising:
disabling the motion sensor before activating the device;
transitioning the mobile device from the hibernation mode to the awake mode;
determining a second period of time of non-activity of the mobile device;
transitioning the mobile device from the awake mode to the hibernation mode; and
enabling the motion sensor.

6. The method of claim 5, further comprising:
receiving a third signal indicating a second motion of the mobile device; and transitioning the mobile device from the hibernation mode to the partial awake mode.

7. The method of claim 6, further comprising disabling the motion sensor for a third period of time, wherein the third period of time is determined based on at least one of: a number of times the motion sensor has been disabled, a charge level of a battery of the mobile device, or historical wakeup data of the mobile device.

8. The method of claim 5, wherein the hibernation mode comprises a first device state where the motion sensor is powered while a remainder of the mobile device is powered off, the partially awake mode comprises a second device state where a processor of the mobile device is executing a boot script, and the awake mode is a third device state where the mobile device is powered up.

9. The method of claim 4, further comprising receiving a third signal from at least one of a capacitive touch sensor, a proximity sensor, a wearable device associated with the mobile device, an optical sensor, an audio sensor, or a Hall-effect sensor.

10. The method of claim 5, further comprising:
receiving a third signal indicating a second motion of the mobile device;
transitioning the mobile device from the hibernation mode to a partial awake mode;
receiving, in the partial awake mode, a fourth signal indicating at least one of: the user is within the proximity of the mobile device or a second touch input of the mobile device by the user is detected;
transitioning the mobile device from the partial awake mode to the awake mode;
determining a fifth signal indicative of a user input to the mobile device was not received within a third period of time;
transitioning the mobile device from the awake mode to the hibernation mode; and
disabling the motion sensor.

11. The method of claim 10, wherein disabling the motion sensor includes disabling the motion sensor for a fourth period of time, wherein the fourth period of time is determined based on at least one of user configurable parameters, historical usage of the mobile device, content on or available to the mobile device, location information for the mobile device, or historical motion models.

12. The method of claim 5, wherein transitioning the mobile device from the hibernate mode to the partial awake mode includes executing a boot script by a processor of the mobile device.

13. The method of claim 10, wherein receiving the first signal includes receiving the first signal from at least one of an accelerometer, an optical sensor, an audio sensor, a wearable device, or a hall sensor.

14. The method of claim 5, further comprising receiving, in the partial awake mode, a third signal indicating one of the proximity to the mobile device or a second touch input received by the mobile device.

15. A device, comprising:
a wakeup sensor;
a validation sensor;
at least one memory that stores computer-executable instructions; and
at least one processor configured to access the at least one memory and execute the computer-executable instructions to:
receive, from the wakeup sensor, a wakeup signal indicating a motion of the device;
provide power to the validation sensor;
initiate a transition of the device from a hibernation mode to a partial awake mode, wherein the at least one processor operates in a low power mode;
determine at least one of: (i) a user is not present within a proximity of the device, or (ii) the device did not receive a first touch input within a first period of time;
initiate a transition of the device from the partial awake mode to the hibernation mode;
receive an input of the user to the device; and
activate the mobile device.

16. The device of claim 15, wherein the wakeup sensor includes at least one of an accelerometer, an optical sensor, an audio sensor, a wearable device, or a hall sensor.

17. The device of claim 15, wherein the validation sensor includes at least one of a capacitive touch sensor, a proximity sensor, a wearable device associated with the device, an optical sensor, an audio sensor, or a Hall sensor.

18. The device of claim 15, wherein the at least one processor is further configured to access the at least one memory and execute the computer-executable instructions to:
transition the device from the hibernation mode to the awake mode;
determine a second period of time of non-activity of the device;
transition the device from the awake mode to the hibernation mode; and
enable the wakeup sensor.

19. The device of claim 18, wherein the at least one processor is further configured to access the at least one memory and execute the computer-executable instructions to:
receive a second wakeup signal indicating a second motion of the device; and
transition the device from the hibernation mode to the partial awake mode.

20. The device of claim 18, wherein the at least one processor is further configured to access the at least one memory and execute the computer-executable instructions to:
receive, form the wakeup sensor, a second wakeup signal indicating a second motion of the device;
transition the device from the hibernation mode to a partial awake mode;
receive, from the validation sensor, a validation signal indicating at least one of the user is within the proximity of the device or a third touch of the device by the user was detected;
transition the device from the partial awake mode to the awake mode;
determine an activation signal was not received within a third period of time;
transition the device from the awake mode to the hibernation mode; and
disable the wakeup sensor for a fourth period of time.

* * * * *